US008611681B2

(12) United States Patent
Genda

(10) Patent No.: US 8,611,681 B2
(45) **Date of Patent: *Dec. 17, 2013**

(54) IMAGE PROCESSING APPARATUS AND IMAGE PROCESSING METHOD FOR ENCODING DENSITY PATTERN INFORMATION IN ATTRIBUTE DATA

(75) Inventor: Daisuke Genda, Kawasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 8 days.

This patent is subject to a terminal disclaimer.

(21) Appl. No.: 13/408,636

(22) Filed: Feb. 29, 2012

(65) Prior Publication Data

US 2012/0224775 A1 Sep. 6, 2012

(30) Foreign Application Priority Data

Mar. 4, 2011 (JP) ................................ 2011-047220

(51) Int. Cl.
*G06K 9/36* (2006.01)
*G06K 9/46* (2006.01)
*G06K 9/34* (2006.01)
*G09G 5/02* (2006.01)

(52) U.S. Cl.
USPC ............................ 382/233; 382/180; 345/599

(58) Field of Classification Search
None
See application file for complete search history.

(56) References Cited

U.S. PATENT DOCUMENTS 4,547,812 A * 10/1985 Waller et al. ................. 358/3.02
5,838,833 A * 11/1998 Ishikawa et al. ............. 382/249
7,369,277 B2 * 5/2008 Ishihara ....................... 358/3.13
7,876,961 B2 * 1/2011 Miyagi ......................... 382/190
2001/0017706 A1 * 8/2001 Shimazaki ..................... 358/1.9
2004/0179239 A1 * 9/2004 Yamazaki et al. ............. 358/2.1
2006/0182358 A1 * 8/2006 Sekino et al. ................. 382/243
2006/0204117 A1 * 9/2006 Sekino et al. ................. 382/243
2006/0215233 A1 * 9/2006 Hirai et al. ..................... 358/448
2006/0256123 A1 * 11/2006 Miyagi ......................... 345/581
2008/0123145 A1 * 5/2008 Kitamura et al. ............ 358/3.06
2008/0246984 A1 * 10/2008 Shoji ............................ 358/1.13
2009/0110313 A1 * 4/2009 Sakaue ......................... 382/243
2009/0213400 A1 * 8/2009 Saka et al. ...................... 358/1.9
2010/0040291 A1 * 2/2010 Genda et al. .................. 382/199
2010/0080474 A1 * 4/2010 Genda et al. .................. 382/233

FOREIGN PATENT DOCUMENTS

JP 2009-94619 4/2009
JP 2010-87961 4/2010

* cited by examiner

*Primary Examiner* — Vu Le
*Assistant Examiner* — Alexander J Lesnick
(74) *Attorney, Agent, or Firm* — Finnegan, Henderson, Farabow, Garrett & Dunner, LLP

(57) ABSTRACT

Disclosed is an image processing apparatus including: an image compression conversion unit that, in an event of quantizing an image having attribute data for each pixel, creates a density pattern in which pixel values of plural pixels composing a region as a quantization target are binarized, quantizes the region based on the density pattern, and binarizes, for each pixel, the attribute data individually owned by the plural pixels composing the region; and an image extension conversion unit that, in an event of decoding the image of the region quantized based on the density pattern by the image compression conversion unit, decides a density pattern of the region before the quantization in response to an attribute pattern that is based on the binarized attribute data of each of the plural pixels composing the region, and decodes the region in response to the decided density pattern.

8 Claims, 39 Drawing Sheets

IN CASE OF BTC(bij)=00

ATTRIBUTE PATTERN

DENSITY PATTERN H0

| 1 | 0 |
|---|---|
| 0 | 0 |

t1 or

| 0 | 1 |
|---|---|
| 1 | 1 |

t11

→

| 1 | 0 |
|---|---|
| 0 | 0 |

1

| 0 | 1 |
|---|---|
| 0 | 0 |

t2 or

| 1 | 0 |
|---|---|
| 1 | 1 |

t12

→

| 0 | 1 |
|---|---|
| 0 | 0 |

2

| 0 | 0 |
|---|---|
| 1 | 0 |

t3 or

| 1 | 1 |
|---|---|
| 0 | 1 |

t13

→

| 0 | 0 |
|---|---|
| 1 | 0 |

3

| 0 | 0 |
|---|---|
| 0 | 1 |

t4 or

| 1 | 1 |
|---|---|
| 1 | 0 |

t14

→

| 0 | 0 |
|---|---|
| 0 | 1 |

4

IN CASE OF BTC(bij)=01

ATTRIBUTE PATTERN | DENSITY PATTERN H1

| 1 | 1 |
|---|---|
| 0 | 0 |
t5 or

| 0 | 0 |
|---|---|
| 1 | 1 |
t9

| 1 | 1 |
|---|---|
| 0 | 0 |
5

| 1 | 0 |
|---|---|
| 1 | 0 |
t6 or

| 0 | 1 |
|---|---|
| 0 | 1 |
t8

| 1 | 0 |
|---|---|
| 1 | 0 |
6

| 0 | 1 |
|---|---|
| 1 | 0 |
t7 or

| 1 | 0 |
|---|---|
| 0 | 1 |
t10

| 0 | 1 |
|---|---|
| 1 | 0 |
7

IN CASE OF BTC(bij)=10

IN CASE OF BTC(bij)=11

ATTRIBUTE PATTERN

| 0 | 1 |
|---|---|
| 1 | 1 |

t11 or

| 1 | 0 |
|---|---|
| 0 | 0 |

t1

→

DENSITY PATTERN H3

| 0 | 1 |
|---|---|
| 1 | 1 |

11

| 1 | 0 |
|---|---|
| 1 | 1 |

t12 or

| 0 | 1 |
|---|---|
| 0 | 0 |

t2

→

| 1 | 0 |
|---|---|
| 1 | 1 |

12

| 1 | 1 |
|---|---|
| 0 | 1 |

t13 or

| 0 | 0 |
|---|---|
| 1 | 0 |

t3

→

| 1 | 1 |
|---|---|
| 0 | 1 |

13

| 1 | 1 |
|---|---|
| 1 | 0 |

t14 or

| 0 | 0 |
|---|---|
| 0 | 1 |

t4

→

| 1 | 1 |
|---|---|
| 1 | 0 |

14

COINCIDENCE CONDITION

C: HALFTONE CONDITION AND DENSITY DIFFERENCE $|C_{den}-bij_{MAX}|<T_C$

M: HIGH RESOLUTION CONDITION AND DENSITY DIFFERENCE $|M_{MAX}-bij_{MAX}|<T_M$

WHEN BTC(bij)=01

COINCIDENCE CONDITION

C: HALFTONE CONDITION AND DENSITY DIFFERENCE $|C_{den}\text{-}bij_{MAX}|<T_C$

M: HIGH RESOLUTION CONDITION AND DENSITY DIFFERENCE $|M_{MAX}\text{-}bij_{MAX}|<T_M$

M1: CONDITION OF M AND DENSITY PATTERN H1

M2: CONDITION OF M AND DENSITY PATTERN H2

Q: NOT APPLY TO ANY OF C, M, M1 AND M2

COINCIDENCE CONDITION

C: HALFTONE CONDITION AND DENSITY DIFFERENCE $|C_{den}-bij_{MAX}|<T_C$

M: HIGH RESOLUTION CONDITION AND DENSITY DIFFERENCE $|M_{MAX}-bij_{MAX}|<T_M$

M1: CONDITION OF M AND DENSITY PATTERN H1

M2: CONDITION OF M AND DENSITY PATTERN H2

Q: NOT APPLY TO ANY OF C, M, M1 AND M2

WHEN BTC(bij)=11

COINCIDENCE CONDITION

C: HALFTONE CONDITION AND DENSITY DIFFERENCE $|C_{den}\text{-}bij_{MAX}|<T_C$

M: HIGH RESOLUTION CONDITION AND DENSITY DIFFERENCE $|M_{MAX}\text{-}bij_{MAX}|<T_M$

EXAMPLE 1

EXAMPLE 2

COMPARATIVE EXAMPLE

ATTRIBUTE DATA

EXAMPLE 1

EXAMPLE 2

COMPARATIVE EXAMPLE

ATTRIBUTE DATA

IMAGE PROCESSING APPARATUS AND IMAGE PROCESSING METHOD FOR ENCODING DENSITY PATTERN INFORMATION IN ATTRIBUTE DATA

CROSS-REFERENCE TO RELATED APPLICATION

The present U.S. patent application claims a priority under the Paris Convention of Japanese patent application No. 2011-047220 filed on Mar. 4, 2011, which shall be a basis of correction of an incorrect translation, and is incorporated by reference herein.

BACKGROUND OF THE INVENTION

1. Field of the Invention

The present invention relates to an image processing apparatus and an image processing method.

2. Description of the Related Art

In recent years, in a copier, a printer and the like, for the purpose of reducing an amount of data, compression processing has been generally performed in the event of storing an image in a memory. As a compression method, a block truncation coding (BTC) mode has been widely known. However, in the case where, in one image, there are mixedly present: a region for which high resolution is required, such as text and graphics; and a region for which high gradation rather than the resolution is required, such as a photograph, then it is difficult to strike a balance between the resolution and the gradation if the compression processing is performed by one compression method. In particular, it has been known that, with regard to edge portions of the text and the graphics, such an image having original resolution cannot be maintained by being subjected to the compression processing and resolution conversion, and sharpness thereof is lost.

In this connection, a technology has been disclosed, in which the BTC compression processing is used in the case of a pixel in a halftone range, and compression processing (fallback compression processing) based on a density pattern is performed in the case of a pixel in a high gradation region, whereby the compression processing is differentiated in response to whether a pixel is the pixel in the halftone range or the pixel in the high gradation region (refer to Japanese Patent Laid-Open Publication Nos. 2009-94619 and 2010-87961).

In the fallback compression processing, it is necessary to estimate and restore the original density pattern from a quantized value at the time of extension. In this estimation of the density pattern, pattern matching is performed between a pixel of interest and pixels around the pixel of interest in compressed data, whereby the density pattern after the restoration is decided. Therefore, an image to be restored by extension processing after the fallback compression is prone to be affected by such peripheral pixels, and in particular, in the graphics and minimum text, it has been possible that an original image cannot be maintained.

SUMMARY OF THE INVENTION

It is an object of the present invention to enhance decoding accuracy of the extension processing.

In order to achieve the above mentioned object, an image processing apparatus, reflecting one aspect of the present invention, includes:

an image compression conversion unit that, in an event of quantizing an image having attribute data for each pixel, creates a density pattern in which pixel values of plural pixels composing a region as a quantization target are binarized, quantizes the region based on the density pattern, and binarizes, for each pixel, the attribute data individually owned by the plural pixels composing the region; and an image extension conversion unit that, in an event of decoding the image of the region quantized based on the density pattern by the image compression conversion unit, decides a density pattern of the region before the quantization in response to an attribute pattern that is based on the binarized attribute data of each of the plural pixels composing the region, and decodes the region in response to the decided density pattern.

An image processing method, reflecting another aspect of the present invention, includes:

an image compression conversion step of, in an event of quantizing an image having attribute data for each pixel, creating a density pattern in which pixel values of plural pixels composing a region as a quantization target are binarized, quantizing the region based on the density pattern, and binarizing, for each pixel, the attribute data individually owned by the plural pixels composing the region; and an image extension conversion step of, in an event of decoding the image of the region quantized based on the density pattern by the image compression conversion step, deciding a density pattern of the region before the quantization in response to an attribute pattern that is based on the binarized attribute data of each of the plural pixels composing the region, and decoding the region in response to the decided density pattern.

BRIEF DESCRIPTION OF THE DRAWINGS

The present invention will be more fully understood by the following detailed description and the accompanying drawings. However, these are not intended to limit the present invention, wherein.

PREFERRED EMBODIMENTS OF THE PRESENT INVENTION

A description is made below of an embodiment of an image processing apparatus and image processing method of the present invention with reference to the drawings.

In this embodiment, a description is made of an example of applying the present invention to a multi function peripheral (MFP). The MFP is a hybrid image forming apparatus provided with a plurality of functions such as a copy function and a print function.

Figure 1:
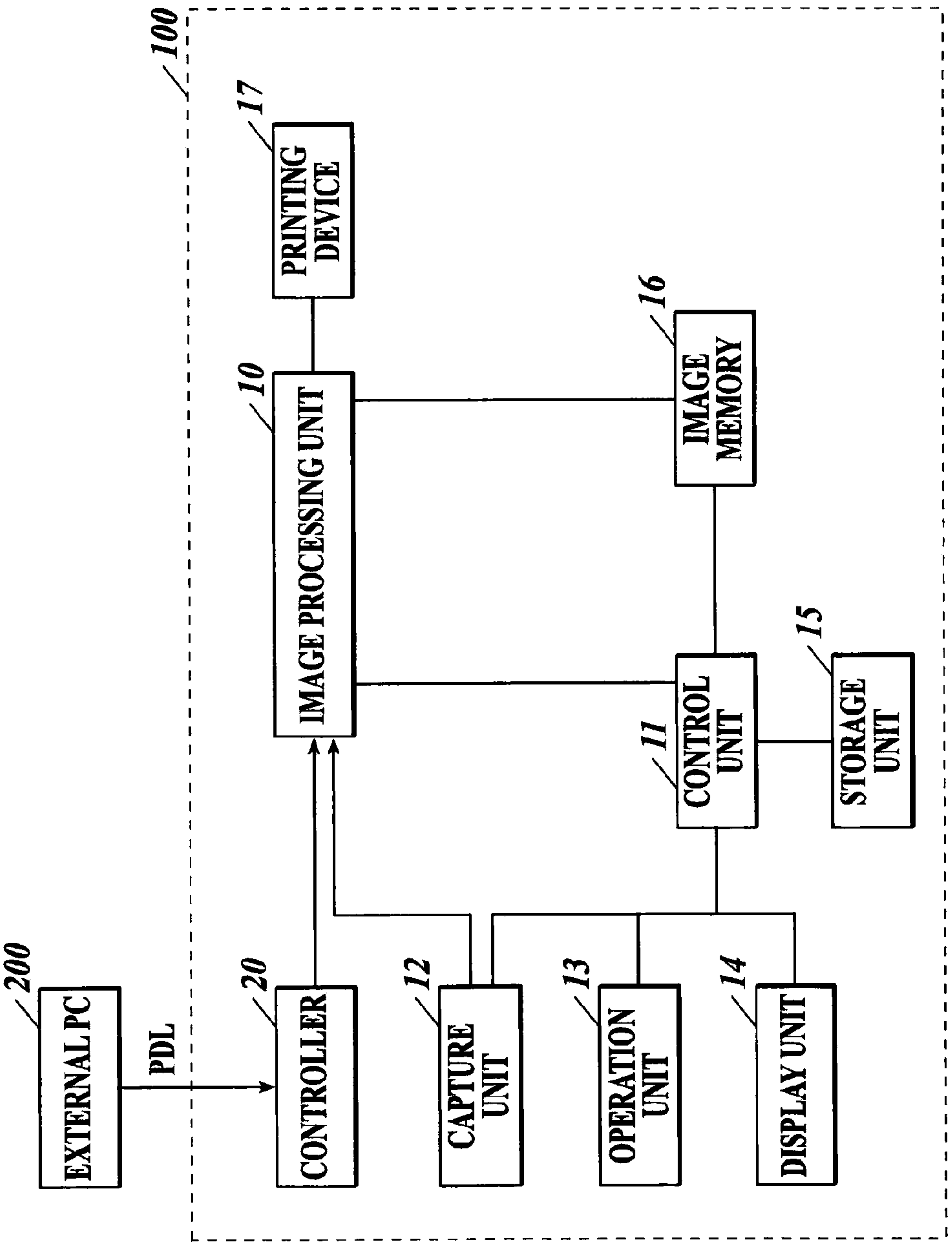
FIG. 1 is a diagram showing a functional configuration of an MFP in this embodiment.

FIG. 1 is a view showing a functional configuration of an MFP 100 in this embodiment.

The MFP 100 is connected to an external personal computer (PC) 200. The MFP 100 creates image data from data in a page description language (PDL) format, which is transmitted from the external PC 200, and then performs image processing for the image data, and thereafter, can perform printing thereof.

As shown in FIG. 1, the MFP 100 is composed by including a controller 20, an image processing unit 10, a control unit 11, a capture unit 12, an operation unit 13, a display unit 14, a storage unit 15, an image memory 16, and a printing device 17.

The controller 20 creates image data of the respective colors of cyan (C), magenta (M), yellow (Y) and black (K).

The data created by an application of the external PC 200 is converted into that in the PDL format by printer driver software, and is transmitted to the controller 20. The controller 20 performs rasterization processing for the transmitted data in the PDL format, and creates image data. In the rasterization processing, the controller 20 analyzes a PDL command, allocates pixels for each of image units to be drawn (each image unit is referred to as an object), and sets data values (pixel values) of the respective colors of C, M, Y and K individually to the allocated pixels.

Moreover, in the rasterization processing, the controller 20 creates, for each of the pixels, attribute data indicating an attribute of an image, and allows the created attribute data to accompany the image. The attribute of the image includes at least three, which are text, graphics, and an image.

Note that, in this embodiment, the description has been made of such a configuration in which the controller 20 is built in the MFP 100; however, a configuration in which the controller 20 is provided outside of the MFP 100.

The control unit 11 is composed by including a central processing unit (CPU), a random access memory (RAM) and the like. By cooperation with a variety of processing programs stored in the storage unit 15, the control unit 11 performs a variety of arithmetic operations, controls the respective units of the MFP 100 in a centralized manner.

The capture unit 12 includes a scanner having an optical system and a charge coupled device (CCD), and creates an image (analog signal) by optically scanning an original. The created image is subjected to various pieces of correction processing in a processing unit (not shown), and is thereafter subjected to digital conversion, and is outputted to the image processing unit 10.

The operation unit 13 is used for inputting an operation instruction of an operator, and is composed by including a variety of keys, a touch panel composed integrally with the display unit 14, and the like. The operation unit 13 creates an operation signal corresponding to an operation, and outputs the created operation signal to the control unit 11.

The display unit 14 displays an operation screen and the like on a display in accordance with control of the control unit 11.

The storage unit 15 stores parameters, setting data and the like, which are necessary for the processing, besides the variety of processing programs.

The image memory 16 stores the image data created by the controller 20, and the image data created by the capture unit 12.

The printing device 17 performs printing based on image data for printing (printing image data), which is inputted from the image processing unit 10. The printing image data is image data obtained by performing various pieces of image processing for the image data created by the controller 20 and the capture unit 12.

The printing device 17 performs printing by an electrophotographic mode, and is composed, for example, of a sheet feed unit, an exposure unit, a developing unit, a fixing unit, and the like. At the time of printing, a laser beam is irradiated by the exposure unit based on the image data, and electrostatic latent images are formed on photosensitive drums. Then, when toner images are formed on the photosensitive drums by development processing of the developing unit, the toner images are transferred onto a sheet fed from the sheet feed unit, and are subjected to fixing processing by the fixing unit.

Figure 2:
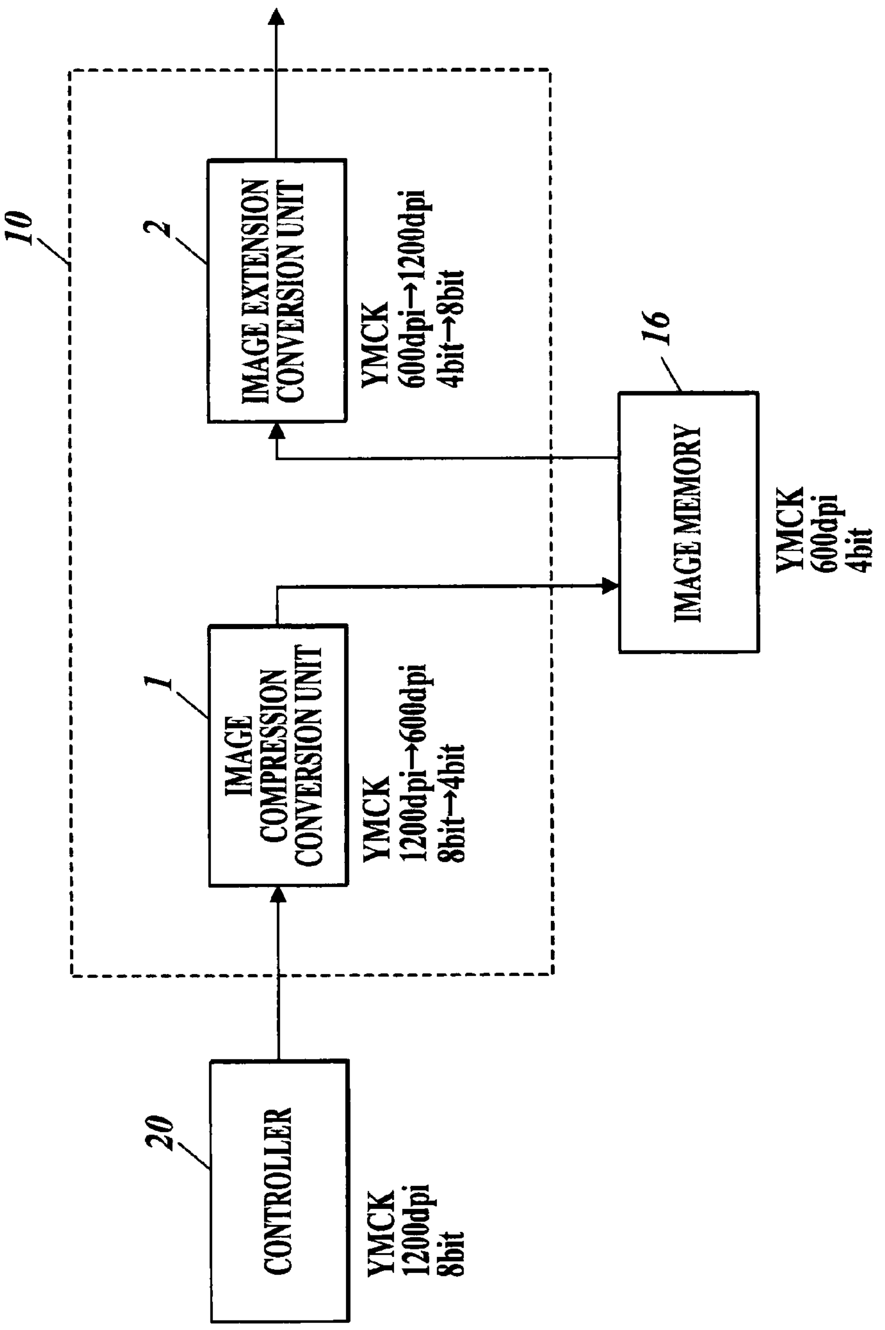
FIG. 2 is a diagram showing constituent portions in an image processing unit of FIG. 1, the constituent portions mainly functioning at a time of compression processing and a time of extension processing.

Next, a description is made of the image processing unit 10 with reference to FIG. 2.

The image data inputted from the controller 20 and the capture unit 12 is once stored in the image memory 16. Then, a printing instruction is made by the operator, the image data is read out from the image memory 16, and is outputted to the printing device 17.

The image processing unit 10 realizes functions as an image processing apparatus. In the event of storing the image data in the image memory 16, the image processing apparatus concerned implements compression processing for the image data, and in addition, performs resolution conversion to low resolution for the image data concerned. For the image data read out from the image memory 16, the image processing apparatus concerned implements extension processing, and in addition, performs resolution conversion for returning the lowered resolution to original resolution. Thereafter, the image processing unit 10 implements image processing such as density correction processing and screen processing for the extended image data, creates the printing image data, and outputs the printing image data to the printing device 17.

FIG. 2 is a view showing constituent portions in the image forming unit 10, the constituent portions mainly functioning at the time of the compression processing or the extension processing. As shown in FIG. 2, the image forming unit 10 is composed by including an image compression conversion unit 1 and an image extension conversion unit 2. Each of the image compression conversion unit 1 and the image extension conversion unit 2 is composed of an image processing circuit, a line memory that holds the image data, and the like.

(Compression Processing)

Figure 3:
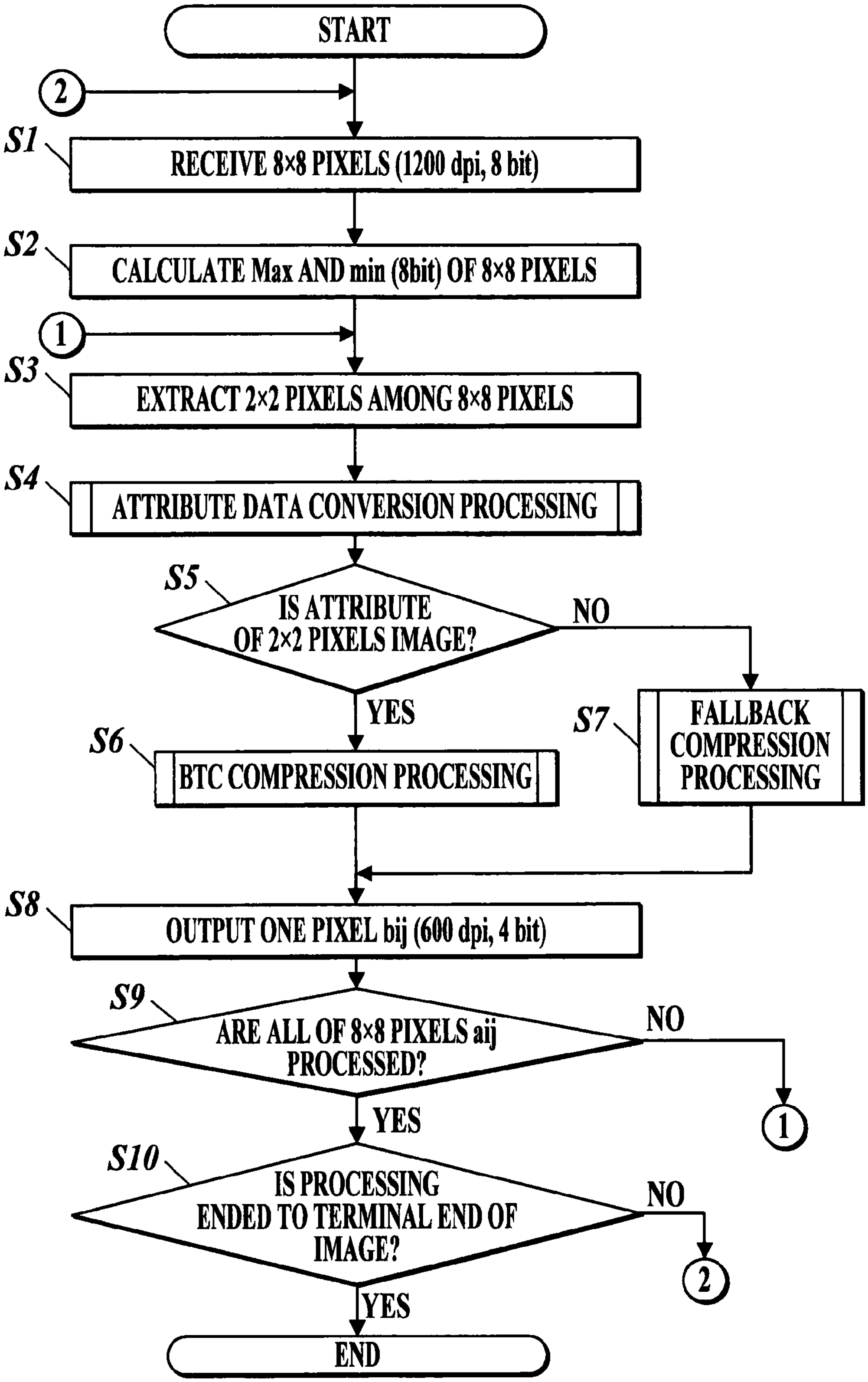
FIG. 3 is a flowchart showing compression processing by an image compression conversion unit of FIG. 2.

With reference to FIG. 3, a description is made of the compression processing executed by the image compression conversion unit 1. In the compression processing, an original image composed of data in which resolution is 1200 dpi and color information is of eight bits per pixel is compressed to data with four bits per pixel, and resolution thereof is converted to 600 dpi, whereby a processed image is created. Note that the compression processing is performed in a unit of an 8×8 pixel block.

Figure 4:
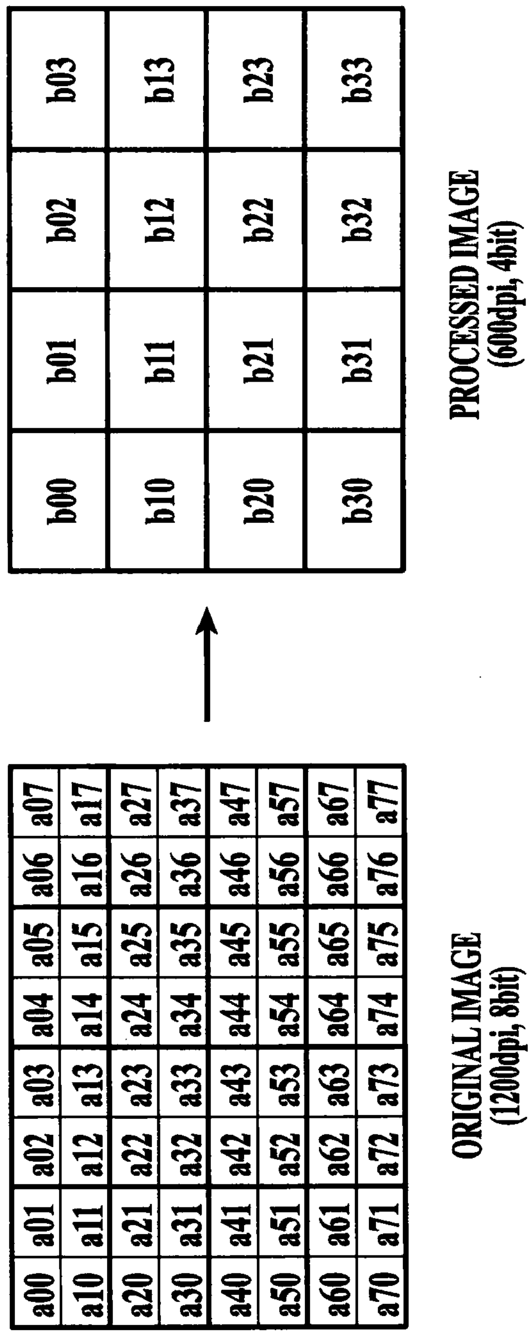
FIG. 4 is a view showing an original image and a processed image before and after the compression processing.

FIG. 4 shows the original image with 8×8 pixels (1200 dpi) and the processed image with 4×4 pixels (600 dpi), which corresponds to a region of the original image.

As shown in FIG. 4, each pixel in the 8×8 pixels of the original image is denoted by reference symbol aij ($0 \le i \le 7$, $0 \le j \le 7$), and each pixel of the 4×4 pixels of the processed image is denoted by reference symbol bij ($0 \le i \le 3$, $0 \le j \le 3$). Moreover, in the following description, pixel values of the pixels aij and bij are sometimes represented by aij and bij.

As shown in FIG. 3, from an image (1200 dpi, 8 bit) as a compression target, the image compression conversion unit 1 extracts and receives pixels in the unit of the 8×8 pixel block (Step S1). Subsequently, from among pixel values owned by the respective pixels of the 8×8 pixels, the image compression unit 1 calculates a maximum value Max (8 bit) and a minimum value min (8 bit) (Step S2). The maximum value Max and the minimum value min in the 8×8 pixels are also a maximum value Max and a minimum value min in the processed image with 4×4 pixels, which is obtained after the compression processing.

After Max and min are calculated, the image compression conversion unit 1 extracts a region with 2×2 pixels as a region as a quantization target from the 8×8 pixels (Step S3). The respective pixels aij of the extracted 2×2 pixels have attribute data. The image compression conversion unit 1 performs attribute data conversion processing for binarizing and compressing the attribute data, which are owned by the respective pixels aij, for each of the pixels, and for converting the attribute data concerned into attribute data (processed attribute data) indicating an attribute of an image of one pixel bij of the processed image, which corresponds to a region with the 2×2 pixels (Step S4). The processed attribute data is attribute data indicating the attribute of the image of the one pixel bij, which corresponds to the region with the 2×2 pixels, and in addition, the processed attribute data indicates attribute data of each pixel in the 2×2 pixels as an original image of the one pixel bij.

Figure 5:
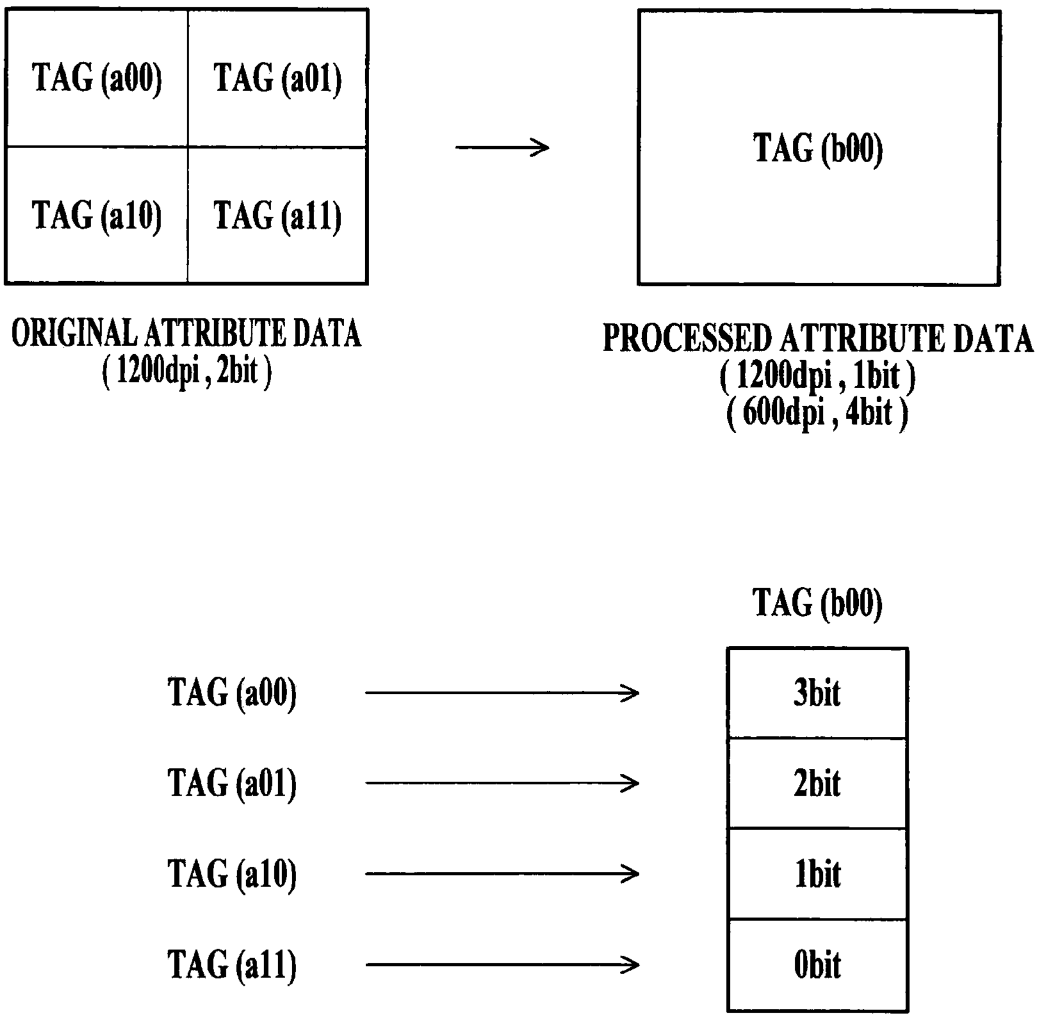
FIG. 5 is a view showing original attribute data and processed attribute data.

While referring to FIG. 5, a description is made of the attribute data conversion processing.

FIG. 5 shows attribute data (original attribute data) (2 bit) corresponding to the original image with the 2×2 pixels (1200 dpi), and attribute data (processed attribute data) (4 bit) corresponding to the processed image (600 dpi) corresponding to the original image.

The attribute data of the respective pixels aij of the 2×2 pixels is represented by TAG(aij) and the attribute data of the pixel bij of the processed image corresponding to the region with the 2×2 pixels is represented by TAG(bij). Then, the respective pieces of TAG(aij) are binarized in accordance with the following conditions (1) and (2), and attribute data converted to 0 or 1 is determined for the four 2×2 pixels. Then, binarized values of the respective pixels are arranged in a predetermined order, and are thereby converted to the one 4-bit TAG(bij). Note that TAG(aij)=11 represents that the data is text attribute data, that TAG(aij)=01 represents that the data is graphic attribute data, and that TAG(aij)=00 represents that the data is image attribute data.

(1) In the case of TAG(aij)=00, then "0"

(2) In the case of not TAG(aij)=00, that is, in the case of TAG(aij)=01 or 11, then "1"

In the attribute data conversion processing, for example as shown in FIG. 5, the binarized value of TAG(a00) is arrayed to the third bit of TAG(b00), the binarized value of TAG(a01) is arrayed to the second bit of TAG(b00), the binarized value of TAG(a10) is arrayed to the first bit of TAG(b00), and the binarized value of TAG(a11) is arrayed to the zero-th bit of TAG(b00), whereby the attribute data is converted to the processed attribute data TAG(b00).

Note that the attribute data conversion processing is not limited to the above-mentioned processing as shown in FIG. 5.

Figure 6:
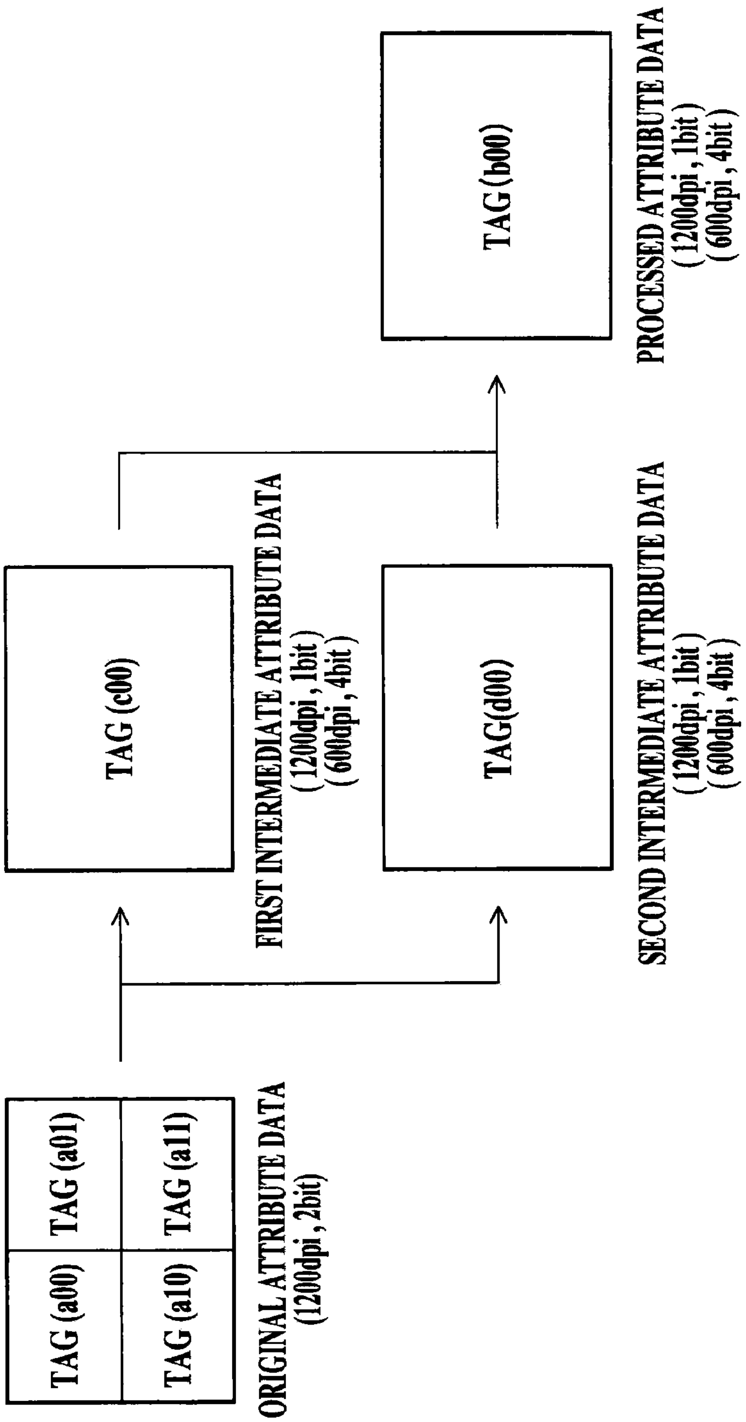
FIG. 6 is a chart showing the original attribute data, first intermediate attribute data, second intermediate attribute data, and the processed attribute data.
Figure 7:
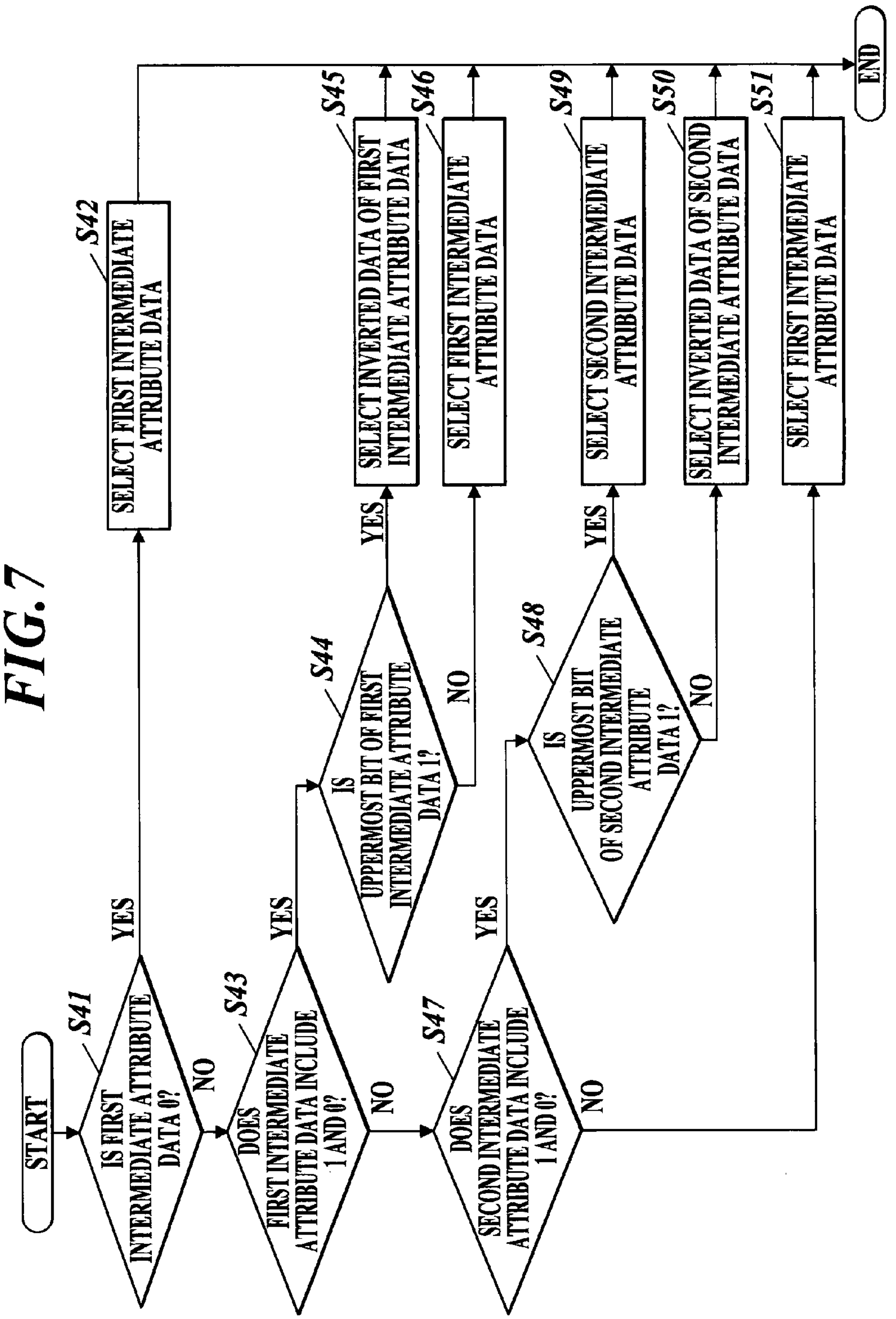
FIG. 7 is a flowchart showing creation processing for the processed attribute data based on the first intermediate attribute data and the second intermediate attribute data.

A description is made of a modification example of the attribute data conversion processing with reference to FIG. 6 and FIG. 7.

FIG. 6 shows the attribute data (original attribute data) (2 bit) corresponding to the original image with the 2×2 pixels (1200 dpi), first intermediate attribute data (4 bit) of a processed image (600 dpi) corresponding to the original image, second intermediate attribute data (4 bit) of a processed image (600 dpi) corresponding to the original image, and the attribute data (processed attribute data) (4 bit) of the processed image (600 dpi) corresponding to the original image.

The attribute data of the respective 2×2 pixels is represented as TAG(aij), the first intermediate attribute data corresponding to the region with the 2×2 pixels is represented as TAG(cij), the second intermediate attribute data corresponding thereto is represented as TAG(dij), and processed image data corresponding thereto is represented as TAG(bij).

As shown in FIG. 6, the original attribute data TAG(aij) is converted into the first intermediate attribute data TAG(cij) and the second intermediate attribute data TAG(dij), and is converted to the processed attribute data TAG(bij) based on either one of TAG(cij) and TAG(dij).

The first intermediate attribute data TAG(cij) is data in which the respective pieces of TAG(aij) are binarized in accordance with the above-described conditions (1) and (2), and binarized values of the respective pixels are arrayed in a predetermined order, and are thereby converted to one 4-bit value.

The second intermediate attribute data TAG(dij) is data in which the respective pieces of TAG(aij) are binarized in accordance with the following conditions (3) and (4), and binarized values of the respective pixels are arrayed in a predetermined order, and are thereby converted to one 4-bit value.

(3) In the case of TAG(aij)=11, then “1”

(4) In the case of not TAG(aij)=11, that is, in the case of TAG(aij)=00 or 01, then “0”

With reference to FIG. 7, a description is made of creation of the processed attribute data TAG(bij), which is based on the first intermediate attribute data TAG(cij) and the second intermediate attribute data TAG(dij).

First, it is determined whether or not the first intermediate attribute data TAG(cij) is 0, that is, all of the four bits which compose TAG(cij) are 0 (Step S41). In the case where the first intermediate attribute data TAG(cij) is 0 (Step S41: YES), then the first intermediate attribute data TAG(cij) is selected and decided as the processed attribute data TAG(bij) (Step S42).

In the case where the first intermediate attribute data TAG (cij) is not 0 (Step S41: NO), then it is determined whether or not the four bits which compose the first intermediate attribute data TAG(cij) include 1 and 0 (Step S43). In the case where the four bits which compose the first intermediate attribute data TAG(cij) include 1 and 0 (Step S43: YES), then it is determined whether or not the uppermost bit (third bit) of the first intermediate attribute data TAG(cij) is “1” (Step S44).

In the case where the uppermost bit (third bit) of the first intermediate attribute data TAG(cij) is “1” (Step S44: YES), then inverted data of the first intermediate attribute data TAG (cij) is selected and decided as the processed attribute data TAG(bij) (Step S45). In the case where the uppermost bit (third bit) of the first intermediate attribute data TAG(cij) is not “1”, that is, is “0” (Step S44: NO), then the first intermediate attribute data TAG(cij) is selected and decided as the processed attribute data TAG(bij) (Step S46).

In the case where the four bits which compose the first intermediate attribute data TAG(cij) do not include 1 and 0 (Step S43: NO), then it is determined whether or not the four bits which compose the second intermediate attribute data TAG(dij) include 1 and 0 (Step S47). In the case where the four bits which compose the second intermediate attribute data TAG(dij) include 1 and 0 (Step S47: YES), then it is determined whether or not the uppermost bit (third bit) of the second intermediate attribute data TAG(dij) is “1” (Step S48).

In the case where the uppermost bit (third bit) of the second intermediate attribute data TAG(dij) is “1” (Step S48: YES), then the uppermost bit (third bit) of the second intermediate attribute data TAG(dij) is selected and decided as the processed attribute data TAG(dij) (Step S49). In the case where the uppermost bit (third bit) of the second intermediate attribute data TAG(dij) is not “1”, that is, “0” (Step S48: NO), then inverted data of the second intermediate attribute data TAG(dij) is selected and decided as the processed attribute data TAG(bij) (Step S50).

In the case where the four bits which compose the second intermediate attribute data TAG(dij) do not include 1 and 0 (Step S47: NO), then the first intermediate attribute data TAG(cij) is selected and decided as the processed attribute data TAG(bij) (Step S51).

As shown in FIG. 6 and FIG. 7, in the event of binarizing the original attribute data, the original attribute data is converted to the processed attribute data by using the first intermediate attribute data and the second intermediate attribute data, which are converted based on different conditions, whereby it becomes possible to decode the attribute data even in the case where the attribute data of the respective pixels which compose the 2×2 pixels is of only text or graphics.

Moreover, the first intermediate attribute data or the second intermediate attribute data, which is selected in response to the uppermost bit, is inverted, whereby it becomes possible to determine that the processed attribute data is derived from the first intermediate attribute data in the case where the uppermost bit is “0”, and that the processed attribute data is derived from the second intermediate attribute data in the case where the uppermost bit is “1”. Therefore, if the uppermost bit is referred to, then it is understood whether the data concerned is the attribute data (first intermediate attribute data) using the value binarized based on whether or not the data is image or the attribute data (second intermediate attribute data) using the value binarized based on whether or not the data is text, and the attribute data can be used effectively in processing such as outline processing, which is implemented after the extension processing.

After the attribute data conversion processing (after Step S4), the image compression conversion unit 1 determines whether or not the attribute of the region with the 2×2 pixels is image based on the converted attribute data (processed attribute data) (Step S5). In Step S5, then it is determined that the attribute is image in the case where all of the four bits which compose the processed attribute data TAG(bij) are “0”.

In the region having such an image attribute, averaging of pixel values is performed in the processing that follows. The resolutions of the text and the graphics are lost if the averaging is performed therefor, and an extent of image deterioration is increased. Therefore, in the case where at least one pixel, which is the pixel aij having the text or graphic attribute, is included in the 2×2 pixels, then the region with the 2×2 pixels is treated as a region of the text and the graphics, whereby the averaging is avoided.

In the case where the attribute of the region with the 2×2 pixels is image (Step S5: YES), then the image compression conversion unit 1 implements BTC compression processing for the region with the 2×2 pixels (Step S6). Meanwhile, in the case where the attribute of the region with the 2×2 pixels is not image (Step S5: NO), then the image compression conversion unit 1 implements fallback compression processing for the region with the 2×2 pixels (Step S7).

After Step S6 or Step S7, the image compression conversion unit 1 outputs a processed image (600 dpi, 4 bit) for an amount of the one pixel bij (Step S8).

Subsequently, the image compression conversion unit 1 determines whether or not the compression processing is performed all of the pixels aij which are 8×8 pixels extracted in Step S1 (Step S9). In the case where unprocessed pixels aij are still present (Step S9: NO), then the image compression conversion unit 1 returns to Step S3, where 2×2 pixels among the unprocessed pixels aij are newly taken as a processing target, and processing of Steps S3 to S9 is repeated therefor. Meanwhile, in the case where the compression processing is performed for all of the pixels aij which are 8×8 pixels (Step S9: YES), the image compression conversion unit 1 determines whether or not the compression processing is ended to a terminal end of the image (Step S10).

In the case where an unprocessed image portion is present (Step S10: NO), the image compression conversion unit 1 returns to Step S1, where 8×8 pixels are newly extracted from the unprocessed image portion, and processing of Steps S1 to S10 is repeated for the extracted 8×8 pixels taken as a target. Then, when the compression processing is performed to the terminal end of the image (Step S10: YES), this processing is ended.

Figure 8:
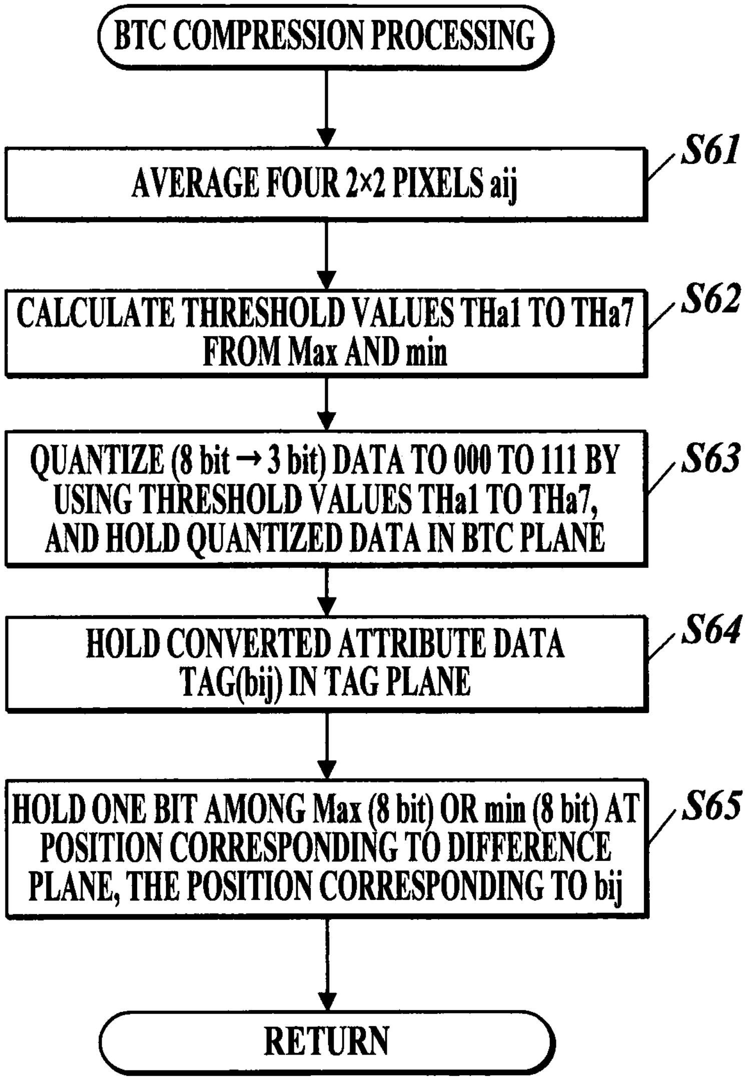
FIG. 8 is a flowchart showing BTC compression processing.

A description is made of the BTC compression processing with reference to FIG. 8.

In the BTC processing, the region with the 2×2 pixels is quantized by a BTC mode.

As shown in FIG. 8, the image compression processing unit 1 calculates an average value avr(bij) of the pixel values of the respective pixels aij which are 2×2 pixels (Step S61). By such averaging, resolution conversion, in which the four pixels aij are converted to the one pixel bij, is realized. Subsequently, the image compression conversion unit 1 calculates threshold values THa1 to THa7 by the following expressions by using the maximum value Max and the minimum value min, which are calculated in Step S2 (Step S62).

$$THa7=\min+(\mathrm{Max}-\min)\times 13/14$$

$$THa6=\min+(\mathrm{Max}-\min)\times 11/14$$

$$THa5=\min+(\mathrm{Max}-\min)\times 9/14$$

$$THa4=\min+(\mathrm{Max}-\min)\times 7/14$$

$$THa3=\min+(\mathrm{Max}-\min)\times 5/14$$

$$THa2=\min+(\mathrm{Max}-\min)\times 3/14$$

$$THa1=\min+(\mathrm{Max}-\min)\times 1/14$$

Figure 9:
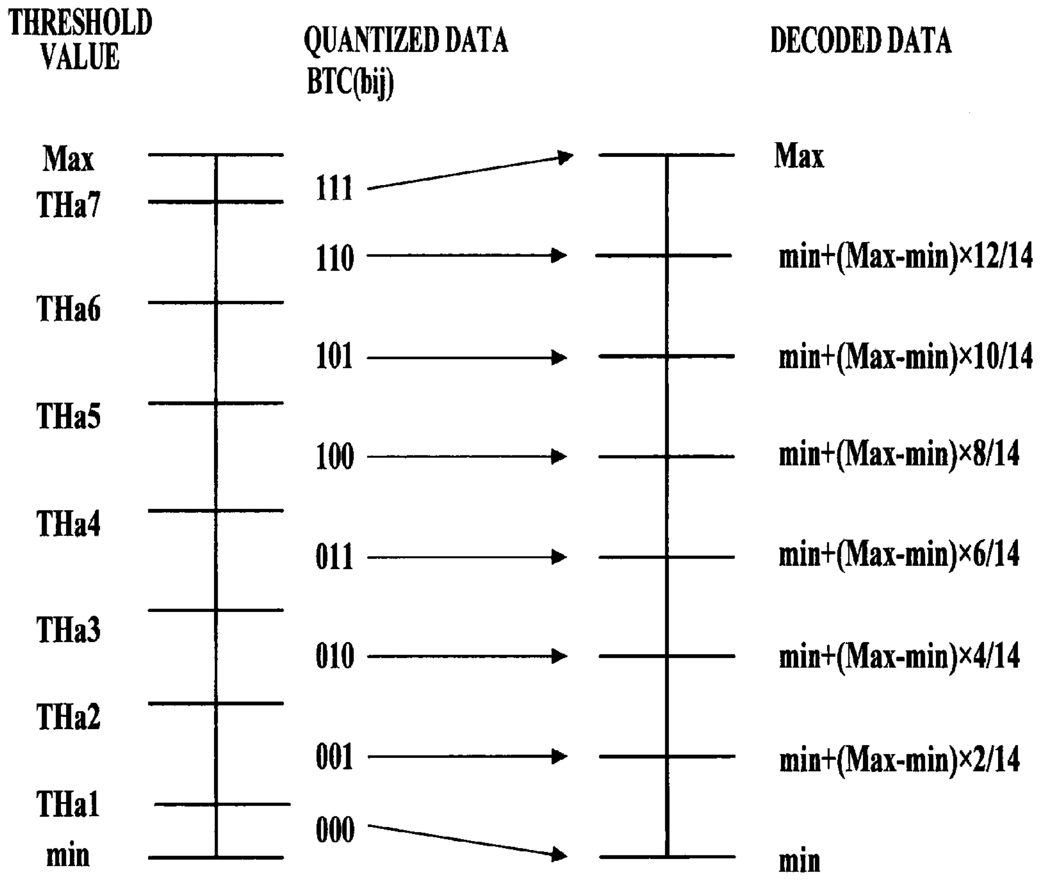
FIG. 9 is a chart showing relationships among threshold values, quantized data and decoded data in the case where the BTC compression processing is performed therefor.

Then, the image compression conversion unit 1 quantizes the average value avr(bij)) of eight bits by using the calculated threshold values THa1 to THa7, and thereby obtains quantized data of three bits which are 000 to 111. This quantized data is represented by BTC(bij). FIG. 9 shows a relationship between the threshold values THa1 and THa7 and the quantized data BTC(bij), and this relationship is represented as in the following expressions.

When THa7≤avr(bij)≤Max, then BTC(bij)=111

When THa6≤avr(bij)≤THa7, then BTC(bij)=110

When THa5≤avr(bij)≤THa6, then BTC(bij)=101

When THa4≤avr(bij)≤THa5, then BTC(bij)=100

When THa3≤avr(bij)≤THa4, then BTC(bij)=011

When THa2≤avr(bij)≤THa3, then BTC(bij)=010

When THa1≤avr(bij)≤THa2, then BTC(bij)=001

When min≤avr(bij)≤THa1, then BTC(bij)=000

That is to say, as shown in FIG. 9, avr(bij) is converted to such 3-bit quantized data BTC(bij) depending on which density range defined by Max, min and THa1 to THa7 avr(bij) belongs to. This quantized data BTC(bij) becomes a pixel value of the one pixel bij of the processed image.

The image compression conversion unit 1 stores the quantized data BTC(bij), which is thus obtained, as a part of the processed image in the line memory and the image memory 16 (hereinafter, generically referred to as a memory). The processed image is composed of data with four bits per pixel, and accordingly, a memory region for storing such a processed image is formed in the memory. The image compression conversion unit 1 allows the region for holding the quantized data BTC(bij) in the memory region concerned to hold the quantized data BTC(bij) (Step S63).

Figure 10:
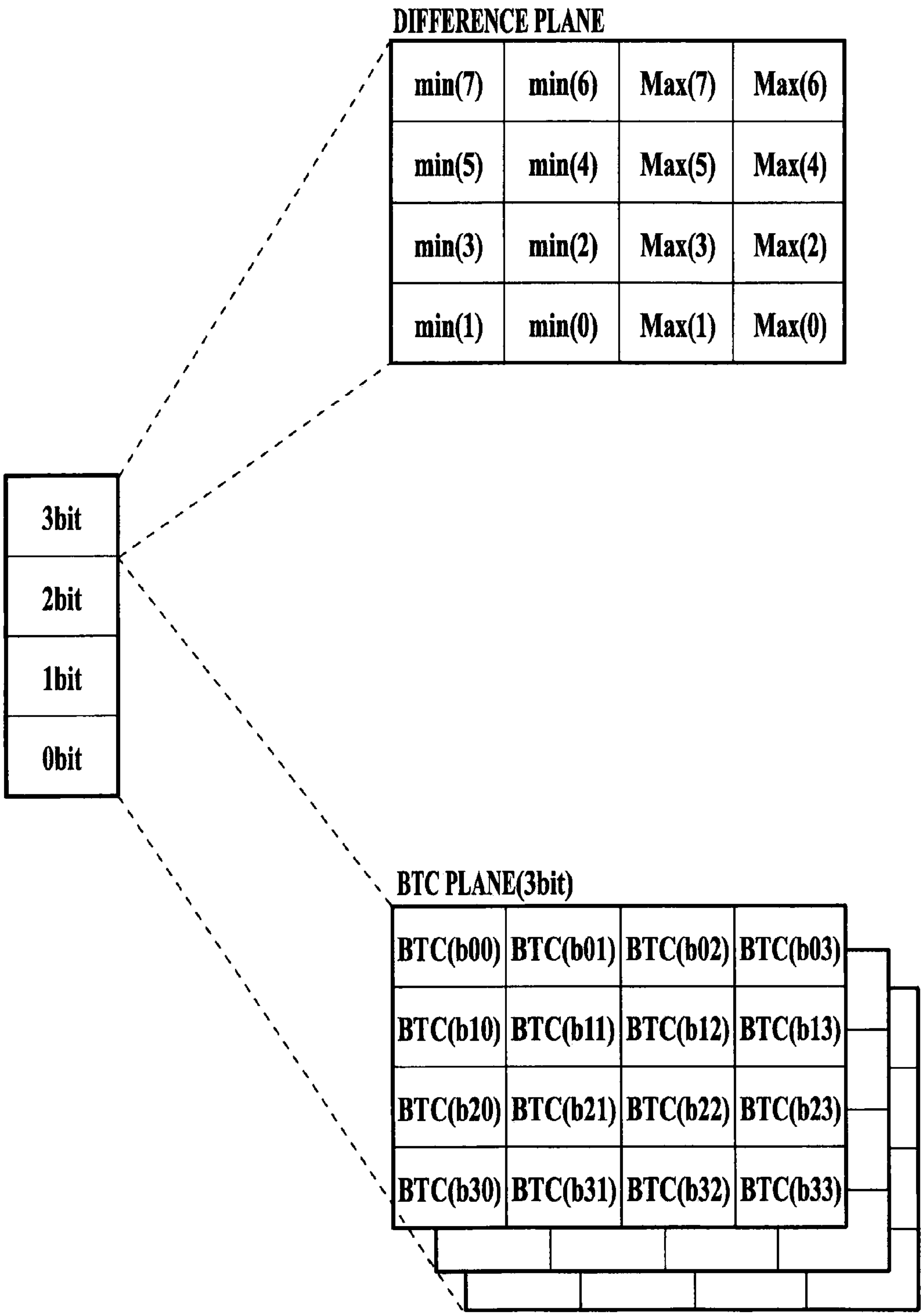
FIG. 10 is a view showing a data configuration of the processed image after being subjected to the BTC compression processing.

A description is made of a data configuration of the processed image with reference to FIG. 10.

The data configuration of the processed image differs depending on whether the data concerned (pixels) is subjected to the BTC compression processing or the fallback compression processing. FIG. 10 shows a data configuration in the case where the BTC compression processing is implemented for all of the respective pixels aij which are 8×8 pixels. The one pixel bij holds the processed image composed of the 4-bit data, and accordingly, in the memory, there is formed a memory region equivalent to four data layers (referred to as planes), in each of which the 1 pixel×1 bit is equivalent to 4×4 pixels.

Among these four planes, in the zero-th to second-bit planes, the quantized data BTC(bij) is held, and the planes concerned are called BTC planes. Moreover, in the third bit plane, the maximum values Max (8 bit) and the minimum values min (8 bit) in the 8×8 pixels of the original image are held, and the plane concerned is called a difference plane. As shown in FIG. 10, the maximum value is represented by Max(k), and the minimum value is represented by min (k) (k indicates a bit position in the eight bits, 0≤k≤7). Max(k) and min(k) in the eight bits are held at positions of 2×4 pixels defined individually for Max(k) and min(k) in the difference plane, and are held one bit by one bit at positions defined by such bit positions k among the 2×4 pixels.

Figure 11:
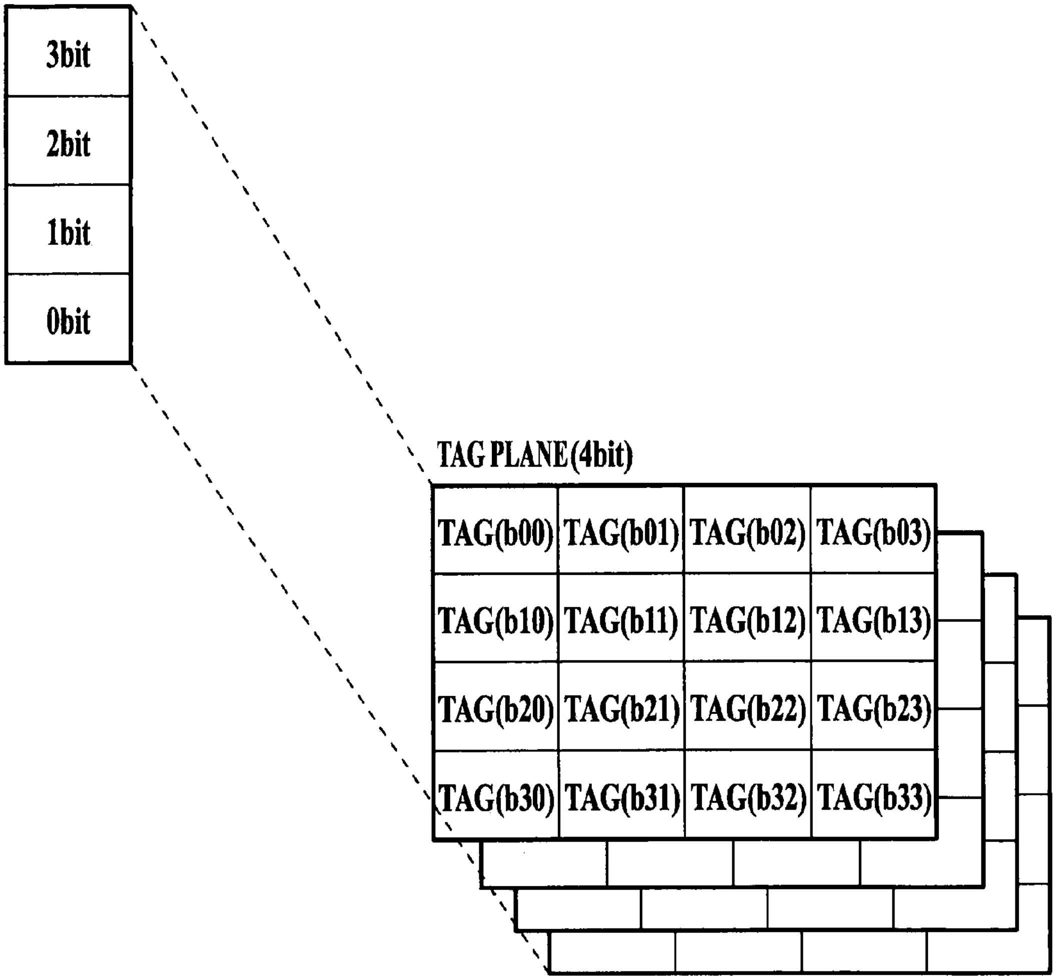
FIG. 11 is a view showing a data configuration of the attribute data.

Moreover, for the purpose of holding the attribute data (processed attribute data) of the processed image so as to correspond to the above-mentioned memory region of the processed image, in the memory, there is formed a memory region corresponding to four planes as shown in FIG. 11. Since the attribute data TAG(bij) is composed of four bits, a memory region equivalent to four bits, that is, equivalent to four planes is ensured.

As shown in FIG. 11, in the zero-th to third-bit planes, the 4-bit attribute data TAG(bij) is held, and the planes concerned are called TAG planes.

Upon holding the quantized data BTC(bij) in the BTC planes, the image compression conversion unit 1 hold the processed attribute data TAG(bij)) in the TAG planes (Step S64). Subsequently, among such 8-bit data values of Max or min, which are calculated in Step S2, the image compression conversion unit 1 extracts a 1-bit data value located at the bit position k corresponding to the pixel bij, and holds the extracted data value at a position corresponding to the pixel bij in the difference plane shown in FIG. 10 (Step S65).

Figure 12:
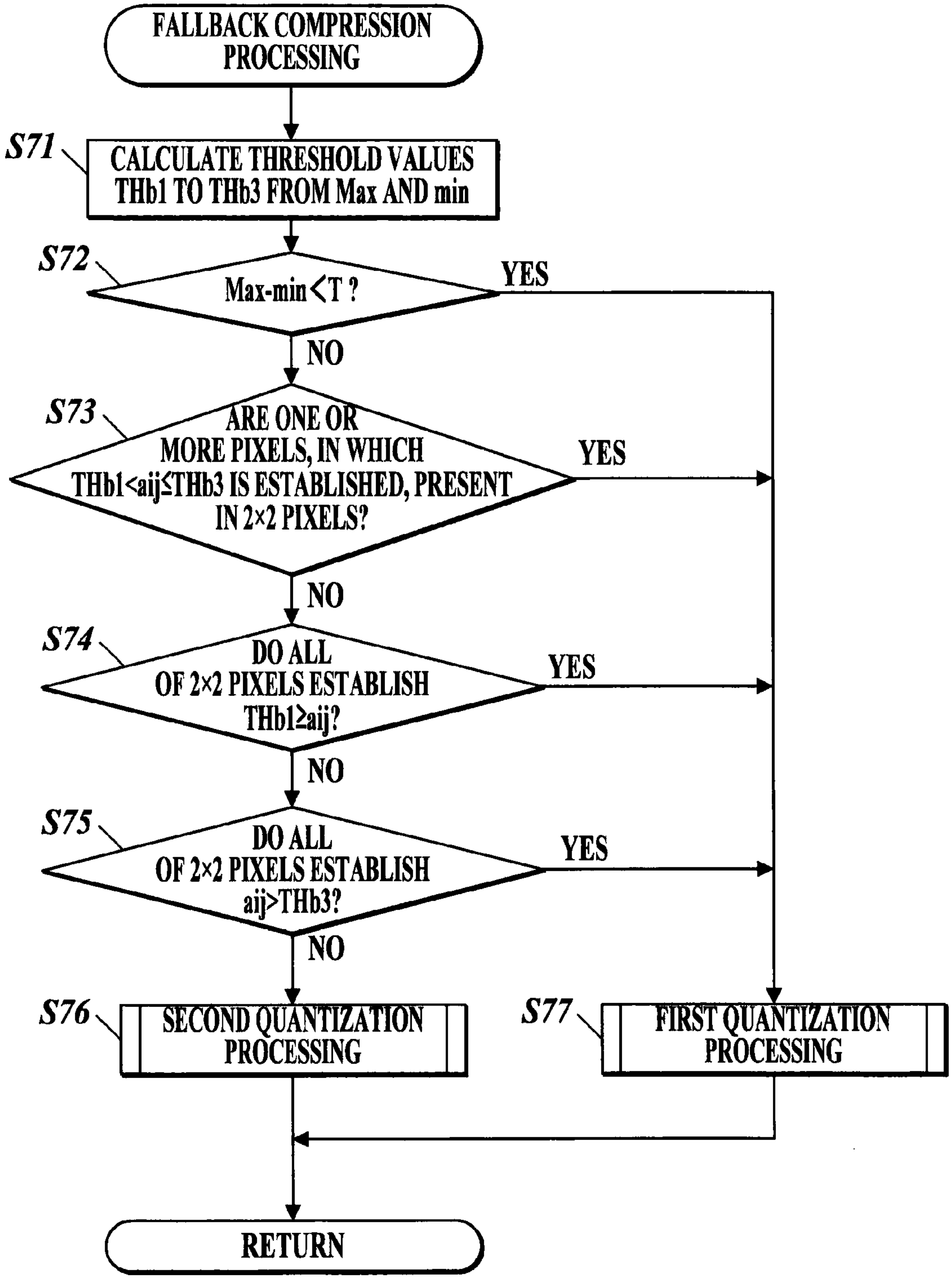
FIG. 12 is a flowchart showing fallback compression processing.

Next, a description is made of the fallback compression processing with reference to FIG. 12.

In the fallback compression processing, different quantization methods are used depending on whether or not the region with the 2×2 pixels, which is taken as the processing target, is a halftone region or a high resolution region. The halftone region refers to an image region for which maintenance of high resolution is not particularly required, and for example, refers to an image portion having a halftone density, an image portion in which, though not having the halftone density, densities of adjacent pixels are approximately the same (a density difference is small), and the like. The high resolution region refers to an image portion for which the maintenance of the high resolution is required, and for example, an image portion such as an edge portion, hairline structure, isolated point and the like of an object. In the high resolution region, the resolution is regarded more important than gradation, and meanwhile, in the halftone region, the gradation is regarded more important than the resolution. As described above, required image quality differs depending on characteristics of the image, and accordingly, such a region with the 2×2 pixels, which has an attribute other than the image, is divided into the high resolution region and the halftone region, and the quantization is performed therefor individually by different methods.

In the case where the following conditions (11) to (14) are satisfied, the region with the 2×2 pixels is determined to be the halftone region, and is quantized by the BTC mode.

(11) The case where at least one pixel, which satisfies THb1<aij≤THb2, is present among the four pixels aij

(12) The case where all of the four pixels aij satisfy aij≤THb1

(13) The case where all of the four pixels aij satisfy aij>THb3

(14) The case where (Max=min)<T (0≤T≤255) is satisfied

T is a threshold value set for determining whether or not a difference between Max and min, that is, a density difference in the region with the 8×8 pixels is small. For example, a value such as T=30 can be set.

By these conditions (11) to (14), it can be determined whether or not the region aij with the 2×2 pixels has a halftone density or whether or not the density values of all thereof are approximately the maximum value or the minimum value and are of substantially the same density.

Meanwhile, in the case where the following condition (15) is satisfied, the region with the 2×2 pixels is determined to be the high resolution region, and is quantized in response to a density pattern of the region concerned.

(15) The case where, in the region aij with the four pixels, pixels satisfying aij≤THb1 and pixels satisfying aij>THb3 are mixedly present By this condition (15), it can be determined whether or not the density change is large in the region aij with the 2×2 pixels.

As a flow of the processing, as shown in FIG. 12, the image compression conversion unit 1 calculates the threshold values THb1 to THb3 by using Max and min, which are calculated by the processing of Step S2 (Step S71). Calculation expressions are shown below.

$$THb3=\min+(\mathrm{Max}-\min)\times 5/6$$

$$THb2=\min+(\mathrm{Max}-\min)\times 3/6$$

$$THb1=\min+(\mathrm{Max}-\min)\times 1/6$$

Subsequently, the image compression conversion unit 1 determines whether or not (Max−min)<T is satisfied, that is, the above-described condition (14) is satisfied (Step S72). In the case where (Max−min)<T is satisfied (Step S72: YES), then the above-described condition (14) is satisfied, and accordingly, the image compression conversion unit 1 proceeds to first quantization processing (Step S77). Even in the case where (Max−min)<T is not satisfied (Step S72: NO), in the case where one or more pixels, in which THb1<aij≤THb3 is established, are present with regard to the pixels aij with the 2×2 pixels (Step S73: YES), then the condition (11) is satisfied, and accordingly, the image compression conversion unit 1 proceeds to the first quantization processing (Step S77). Moreover, in the case where all of the four pixels aij establish aij≤THb1 (Step S74: YES), then the condition (12) is satisfied, and in the case all of the four pixels aij establish aij>THb3 (Step S75: Y), then the condition (13) is satisfied, and accordingly, the image conversion compression unit 1 proceeds to the first quantization processing (Step S77).

Meanwhile, in the case where any of the conditions (11) to (14) is not satisfied (Step S73: NO, and Step S74: NO, and Step S75: NO), then this is a case where the pixels satisfying aij≤THb1 and the pixels satisfying aij>THb3 are mixedly present in the region with the 2×2 pixels. Accordingly, the above-described condition (15) is satisfied, and the image compression conversion unit 1 proceeds to second quantization processing (Step S76).

Figure 13:
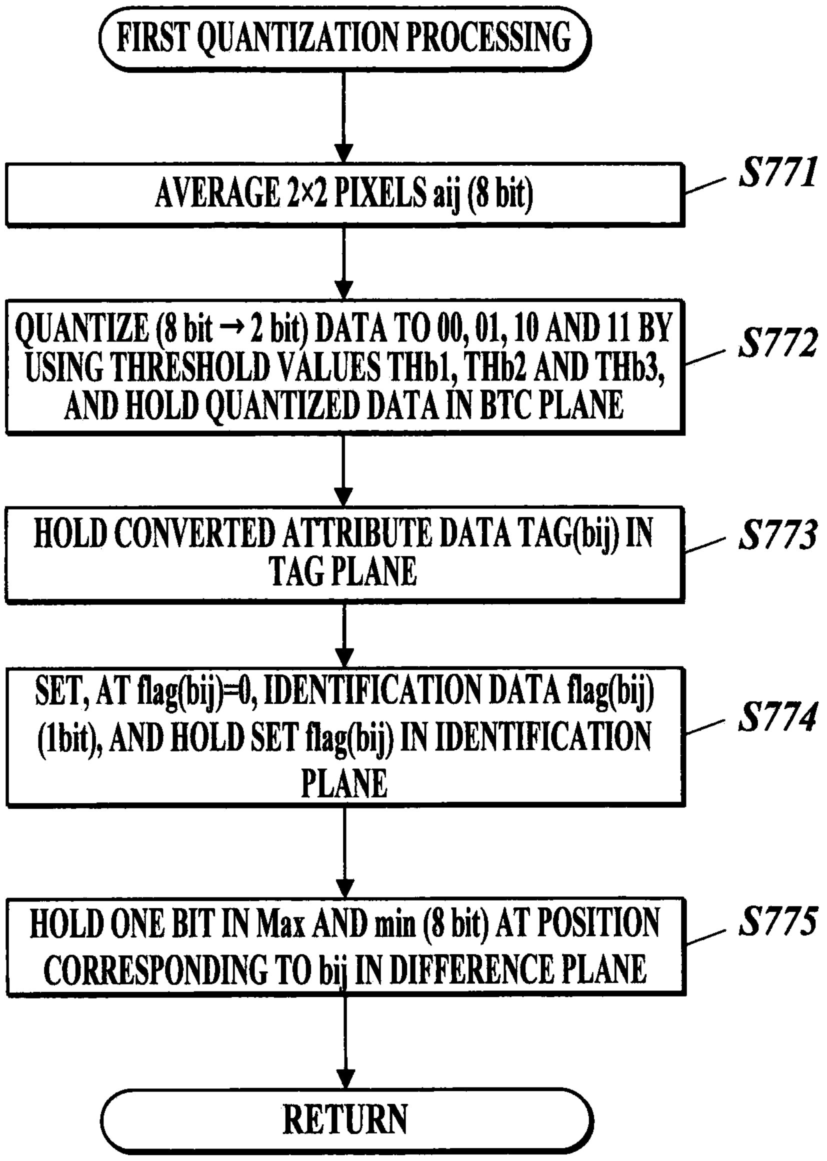
FIG. 13 is a flowchart showing first quantization processing.

A description is made of the first quantization processing with reference to FIG. 13.

In the first quantization processing, the region with the 2×2 pixels is quantized by the BTC method.

As shown in FIG. 13, the image compression conversion unit 1 performs averaging for the 2×2 pixels satisfying the conditions (11) to (14), and calculates the average value avr (bij) thereof (Step S771).

Figure 14:
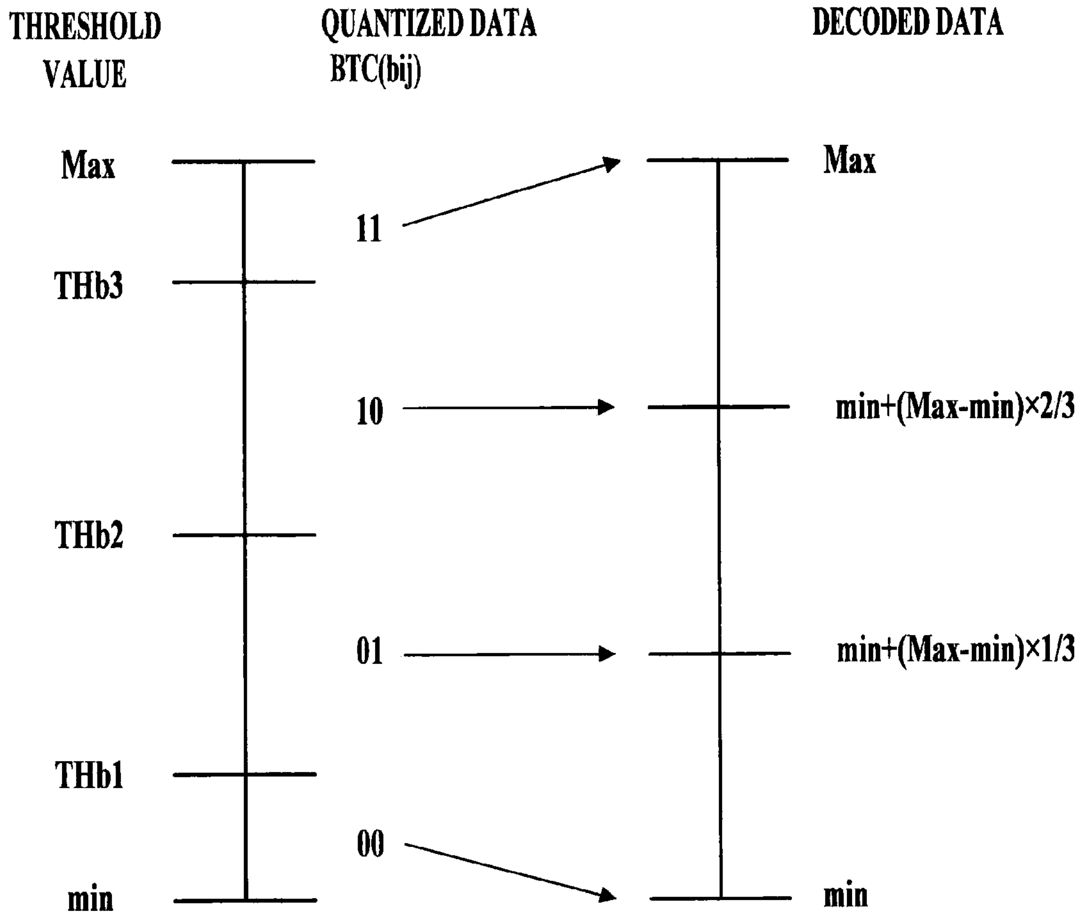
FIG. 14 is a chart showing relationships among threshold values, quantized data and decoded data in the case where the first quantization processing is performed therefor.

Subsequently, the image compression conversion unit 1 quantizes the average value avr(bij) to 2-bit data values, which are 00, 01, 10 and 11, by using the threshold values THb1 to THb3 calculated in the processing of Step S71. Such quantized data is represented by BTC(bij). FIG. 14 shows relationships between the threshold values THb1 to THb3 and the quantized data BTC(bij), and these relationships are represented as in the following expressions.

When THb3≤avr(bij)≤Max, then BTC(bij)=11

When THb2≤avr(bij0<THb3, then BTC(bij)=10

When THb1≤avr(bij)<THb2, then BTC(bij)=01

When min≤avr(bij)<THb1, then BTC(bij)=00

This quantization is quantization by the BTC mode in a similar way to the BTC compression processing, and is different therefrom only in compression ratio. Moreover, this quantization is the same as the BTC compression processing in that the resolution conversion is performed together with the quantization.

The image compression conversion unit 1 holds the obtained BTC(bij) as a part of the processed image in the BTC planes of the line memory or the image memory 16 (Step S772).

Figure 15:
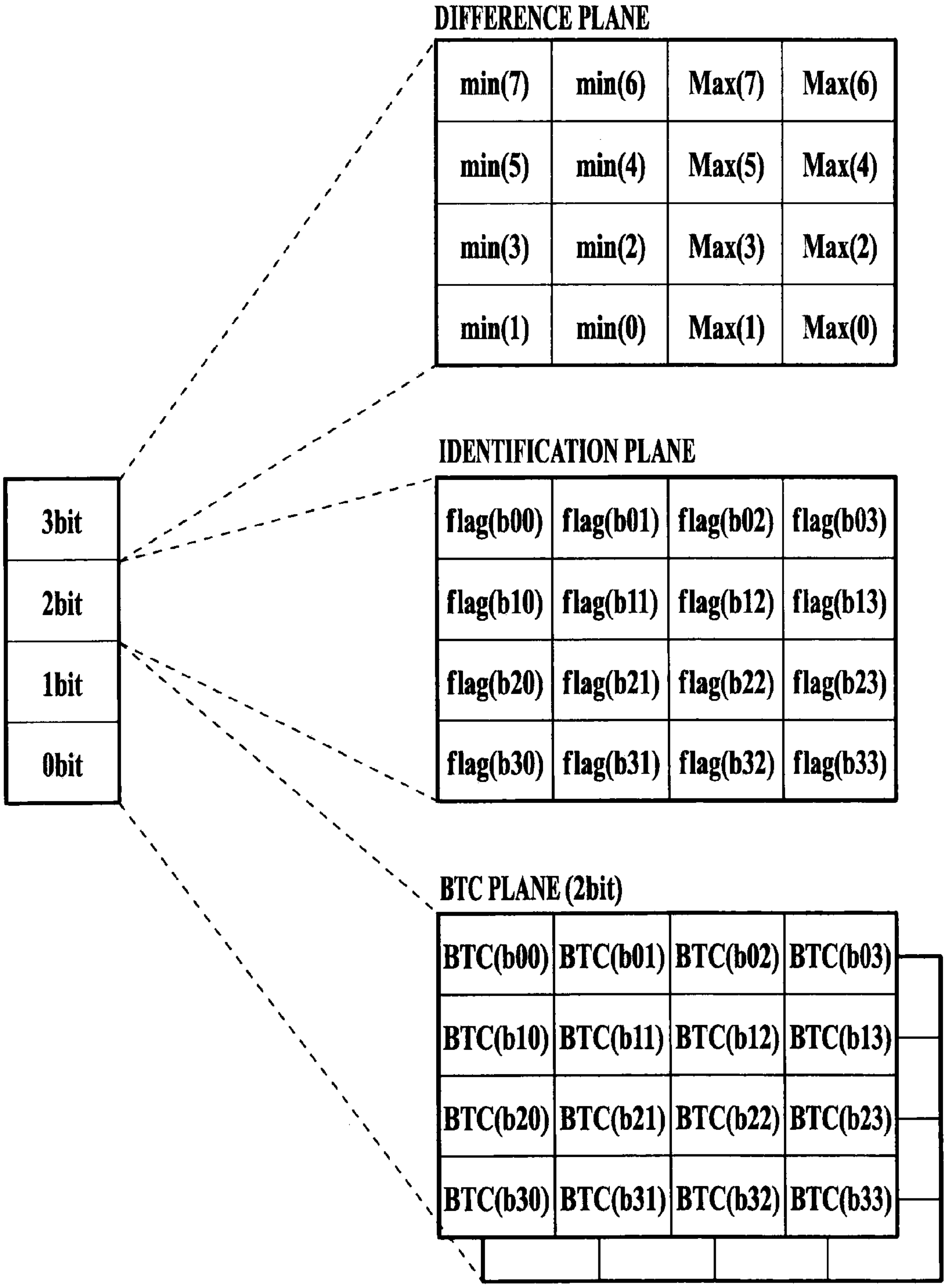
FIG. 15 is a view showing a data configuration of the processed image after being subjected to the fallback compression processing.

As mentioned above, the data configuration of the processed image subjected to the fallback compression processing is different from the data configuration of the processed image subjected to the BTC compression processing. Accordingly, with reference to FIG. 15, a description is made of the data configuration of the processed image subjected to the fallback compression processing. FIG. 15 shows a data configuration of the processed image in the case where the fallback compression processing is implemented for all of the 8×8 pixels aij. Since the one pixel bij stores the 4-bit processed image, a memory region is formed, in which the one pixel bij×1 bit corresponds to four data layers (referred to as planes) equivalent to 4×4 pixels.

Among these four planes, 2-bit BTC(bij) is held in the zero-th and first-bit planes, and the planes concerned are called BTC planes.

In the second-bit plane, 1-bit identification data flag(bij) is held, and the plane concerned is called an identification plane. The identification data flag(bij) is data for use in identifying whether the region concerned is the halftone region or the high resolution region. By referring to this identification data flag(bij), the quantization method used in the compression processing can be identified. flag(bij)=0 indicates that the 2×2 pixels aij corresponding to the pixel bij is subjected, as the halftone region, to the first quantization processing, and flag (bij)=1 indicates that the 2×2 pixels aij concerned is subjected, as the high resolution region, to the second quantization processing.

In the third-bit plane, the maximum values Max (8 bit) and the minimum values (8 bit) in the 8×8 pixels of the original image are held, and the plane concerned is called a difference plane. This difference plane is the same as the difference plane in the processed image subjected to the BTC compression processing.

That is to say, the processed image subjected to the fallback compression processing is different in data configuration from the processed image subjected to the BTC compression processing. In the processed image subjected to the BTC compression processing, a memory region for the identification plane is allocated to the BTC plane by an amount that the identification plane is not present, and reduction of the compression ratio is achieved.

Note that FIG. 15 shows a data configuration in the case where the fallback compression processing is implemented for all of the 8×8 pixels aij. The BTC compression processing and the fallback compression processing can be switched in a unit of the 2×2 pixels, and accordingly, it is also possible to switch the data configuration of the processed image in a unit of the 2×2 pixels.

Also with regard to the processed image subjected to the fallback compression processing, the attribute data of the processed image is held in the memory. Accordingly, as shown in FIG. 11, a memory region equivalent to four planes including the TAG plane is formed. The image compression conversion unit 1 holds, in the TAG plane, the converted attribute data (processed attribute data) TAG(bij) corresponding to the attribute data (original attribute data) of the 2×2 pixels aij (Step S773).

Subsequently, the image compression conversion unit 1 sets, at flag(bij)=0, the identification data flag (bij) of the pixel bij of the processed image, which corresponds to the 2×2 pixels aij, and holds the set flag(bij)=0 at a position of the identification plane, which corresponds to the pixel bij (Step S774). Moreover, from the 8-bit data values of Max or min, which are calculated in Step S2 shown in FIG. 3, the image compression conversion unit 1 extracts a 1-bit data value located at the bit position k corresponding to the pixel bij, and holds the extracted data value at a position corresponding to the pixel bij in the difference place shown in FIG. 15 (Step S775).

When the above-described processing is ended, the image compression conversion unit 1 returns to Step S8 shown in FIG. 3. Processing on and after Step 8 is as mentioned above, and accordingly, a description thereof is omitted here.

Figure 16:
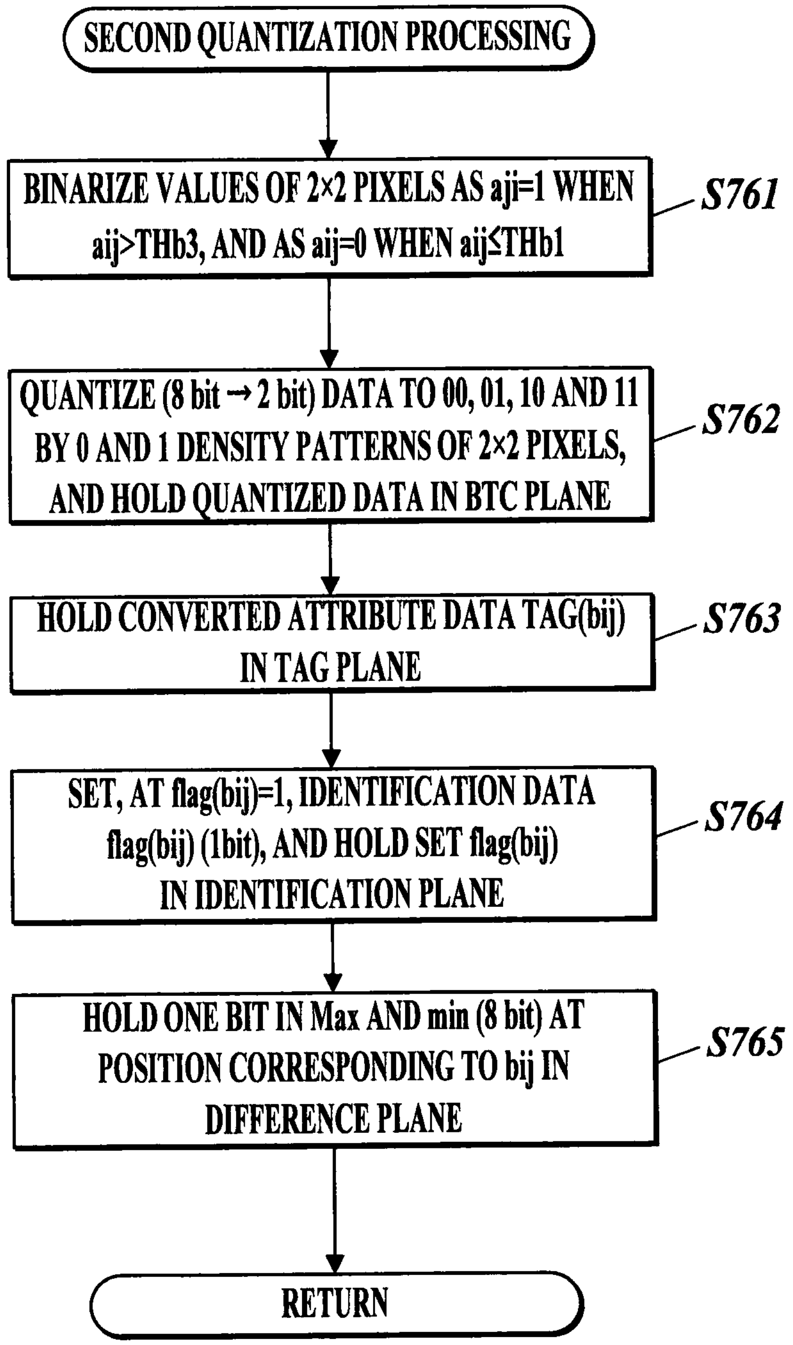
FIG. 16 is a flowchart showing second quantization processing.

Next, a description is made of the second quantization processing with reference to FIG. 16.

In the second quantization processing, a density pattern of the region with the 2×2 pixels is formed, and the quantization is performed in response to the density pattern concerned.

As shown in FIG. 16, the image compression conversion unit 1 binarizes the pixel values of the 2×2 pixels aij, which satisfy the condition (15), in accordance with the following conditions, and creates density patterns, in each of which data values of 0 or 1 are determined for four pixels which are the 2×2 pixels (Step S761).

When aij>THb3, then aij=1

When aij≤THb1, then aij=0

When the condition (15) is satisfied, a pixel with aij>THb3 is approximate to the maximum value Max, and a pixel with aij≤THb1 is approximate to the minimum value min. Hence, the pixel values are binarized as described above, and the binarized values of 0 or 1 are set at the positions of the respective pixels aij, whereby a density change of the region with the 2×2 pixels can be formed into patterns.

Subsequently, the image compression conversion unit 1 quantizes the pixel values to the 2-bit data values, which are 00, 01, 10 and 11, by the created density patterns. Such quantized data is represented by BTC(bij). Specifically, the density patterns are classified into some groups in advance, and the quantized data is allocated for each of the groups. The image compression conversion unit 1 obtains the quantized data BTC(bij) corresponding to the density patterns created for the 2×2 pixels aij. In such a way, the resolution conversion can also be realized.

Figure 17:
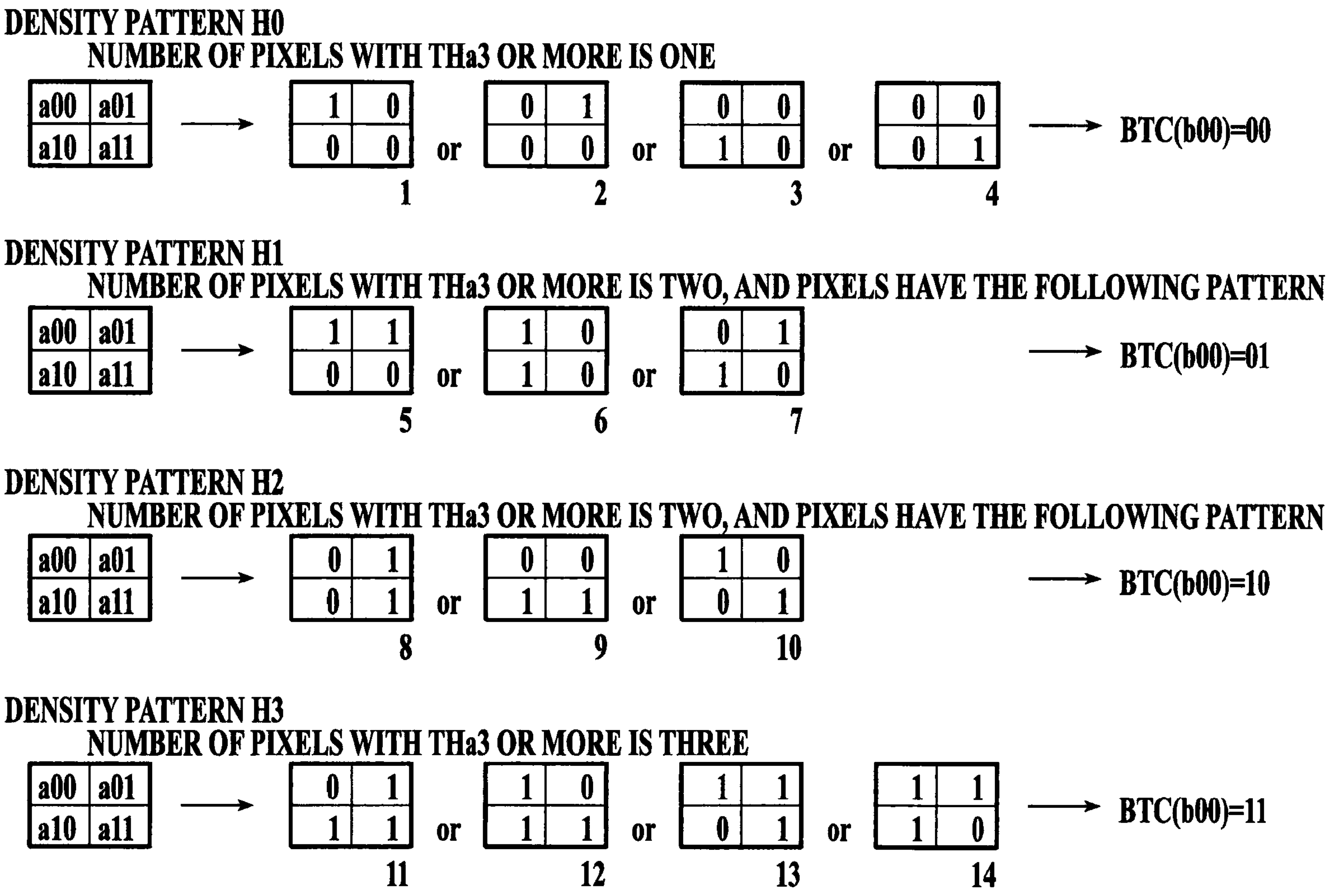
FIG. 17 is a view showing correspondence relationships between density patterns and quantized data determined in the density patterns.

Here, a description is made of an example where, as shown in FIG. 17, the density patterns are classified into four groups which are H0 to H3, and the quantized data 00, 01, 10 and 11 are allocated for each of the groups.

Note that the respective density patterns are imparted with pattern numbers (numbers shown on lower right portions of the density patterns).

As shown in FIG. 17, the group of the density pattern H0 is a group in which each of the density patterns includes only one piece of aij=1 among the 2×2 pixels, and includes density patterns with pattern numbers 1 to 4. In the case applying to the density pattern H0, the 2×2 pixels aij are quantized to BTC(bij)=00.

Moreover, each of the groups of the density patterns H1 and H2 is a group in which each of the density patterns includes two pieces of aij=1. As shown in FIG. 17, a density pattern is classified as the density pattern H1 or H2 depending on which position aij=1 is located at. The group of the density pattern H1 includes density patterns with pattern numbers 5 to 7, and the group of the density pattern H2 includes density patterns with pattern numbers 8 to 10. In the case of applying to the density pattern H1, the 2×2 pixels aij are quantized to BTC(bij)=01, and in the case of applying to the density pattern H2, the 2×2 pixels aij are quantized to BTC(bij)=10.

The group of the density pattern H3 is a group in which the density pattern includes three pieces of aij=1, and includes density patterns with pattern numbers 11 to 14. In the case of applying to the density pattern H3, the 2×2 pixels aij are quantized to BTC(bij)=11.

In the event of decoding, the density pattern is estimated from the value of the quantized data BTC(bij). As described above, the density patterns, in which the densities of the 2×2 pixels are the same (the number of included 0 and the number of included 1 are the same), are quantized as the same group. In such a way, even in the case where a mistake is made on the estimation of the positions of 0 and 1, the pixels concerned can be expressed at the same density in the region with the 2×2 pixels. Hence, there is an effect that an error is less likely to visually appear as a deterioration of the image quality even if the error occurs.

Note that the density patterns are not subjected to such group classification by the number of aij=1 therein as described above, but may be subjected to the group classification by arrayed positions of 0 and 1 in the density patterns, and the like, and the quantized data may be allocated to the respective groups.

The image compression conversion unit 1 holds the quantized data BTC(bij), which is thus obtained, in the BTC plane of the memory, which is shown in FIG. 15 (Step S762). Subsequently, the image compression conversion unit 1 holds the attribute data TAG(bij), which is already converted, in the TAG plane (Step S763). Moreover, the image conversion compression unit 1 sets, at flag(bij)=1, the identification data flag(bij) of the already quantized pixel bij, and holds the set identification data in the identification plane shown in FIG. 15 (Step S764). Moreover, from the 8-bit data values of Max or min, which are calculated in the processing of Step S2 (refer to FIG. 3), the image compression conversion unit 1 extracts the 1-bit data value located at the bit position k corresponding to the pixel bij, and holds the extracted 1-bit data value in the position of the difference plane shown in FIG. 15, which corresponds to the pixel bij (Step S765).

When the above-described processing is ended, the image compression conversion unit 1 returns to Step S8 shown in FIG. 3. Processing on and after Step 8 is as mentioned above, and accordingly, a description thereof is omitted here.

(Extension Processing)

Figure 18:
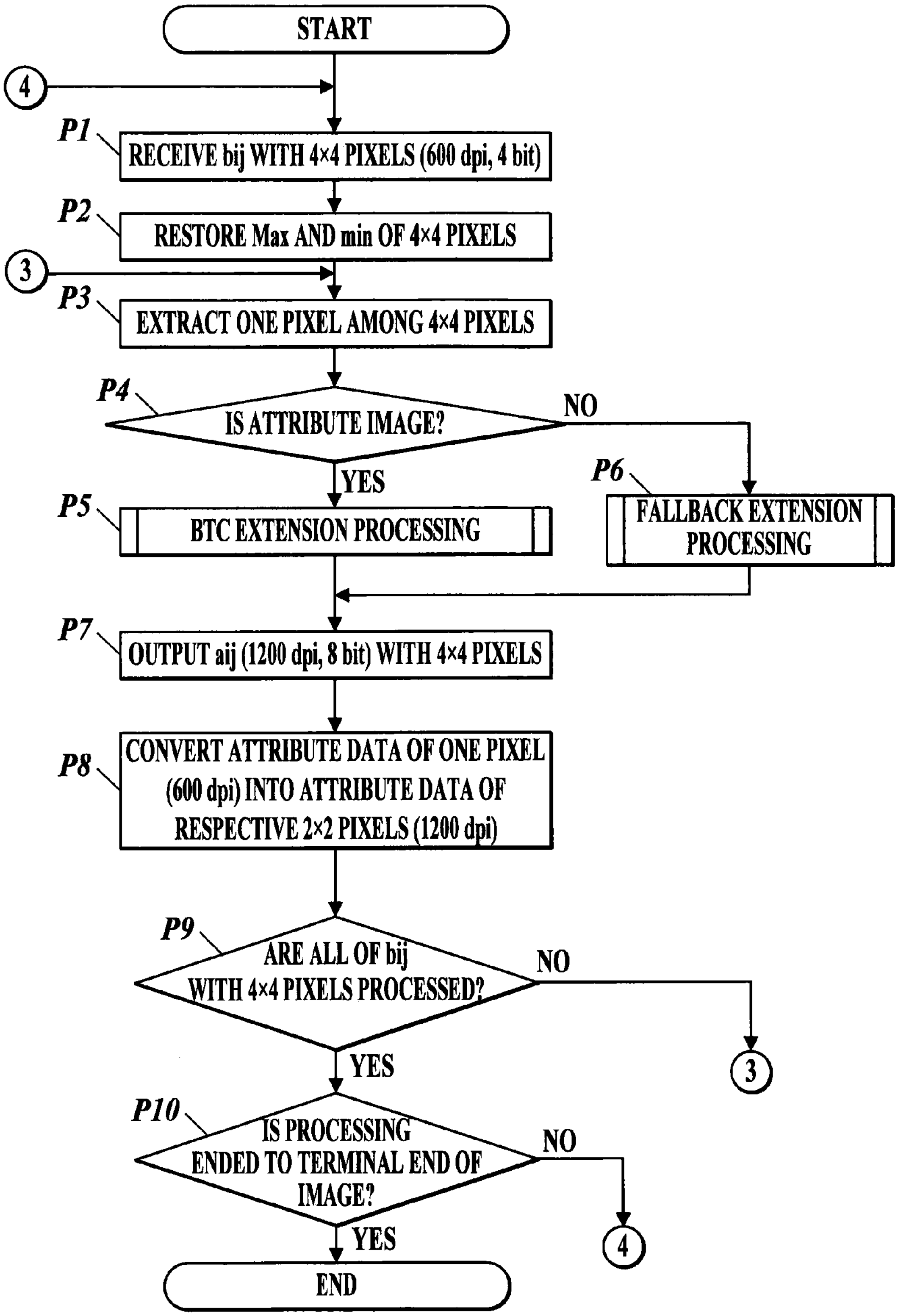
FIG. 18 is a flowchart showing the extension processing by an image extension conversion unit of FIG. 2.

Next, with reference to FIG. 18, a description is made of the extension processing by the image extension conversion unit 2.

Figure 19:
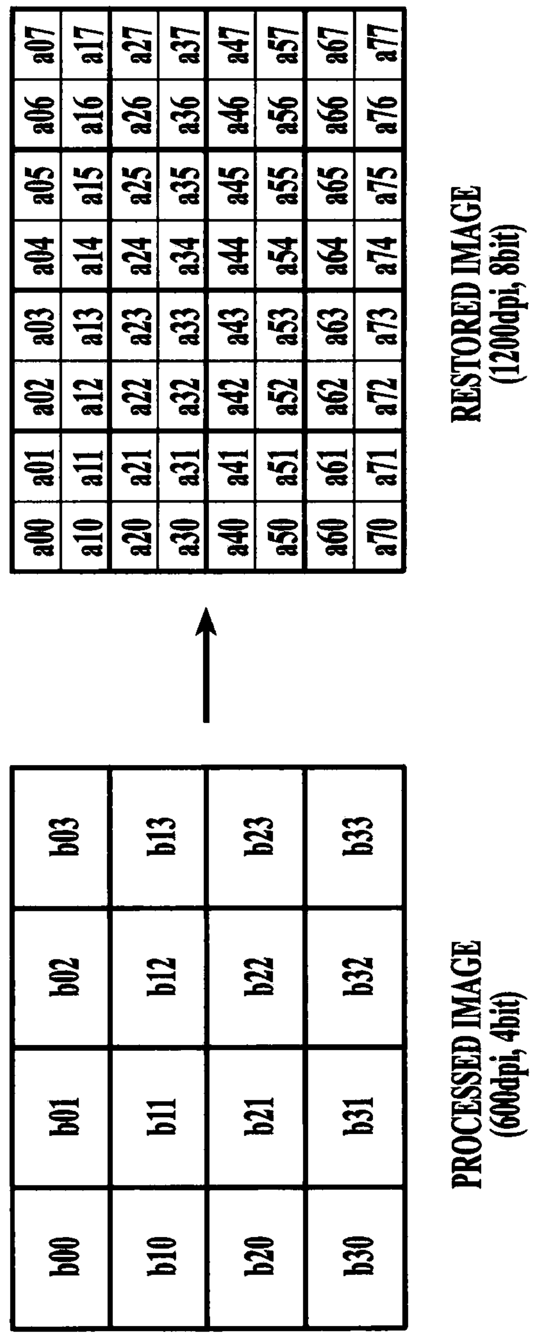
FIG. 19 is a view showing the processed image and a restored image before and after the extension processing.

In the extension processing, as shown in FIG. 19, the processed image with four bits per pixel is decoded, and a restored image composed of data with eight bits per pixel is obtained. The extension processing is performed in a processing unit of 4×4 pixels (bij) corresponding to the 8×8 pixels (aij) as a processing unit of the compression processing. Moreover, the processed image with resolution of 600 dpi is subjected to the resolution conversion, and is converted to such a restored image with resolution of 1200 dpi.

As shown in FIG. 18, the image extension conversion unit 2 extracts and receives the processed image as an extension target in a processing unit of the 4×4 pixels (Step P1). Subsequently, the image extension conversion unit 2 individually obtains Max(k) and min(k) from the difference plane of the processed image with the 4×4 pixels, arrays the obtained Max(k) and min(k) in a bit order, and restores the data of the maximum values Max and minimum values min with the 4×4 pixels (Step P2).

Subsequently, the image extension conversion unit 2 extracts, as a pixel of interest, one pixel bij in the processed image of the 4×4 pixels (Step P3). The image extension conversion unit 2 obtains, from the TAG plane, attribute data TAG(bij) corresponding to the extracted one pixel, and based on this attribute data TAG(bij), determines whether or not the attribute of the pixel of interest bij is image (Step P4). In Step P4, in the case where all of the four bits which compose the attribute data TAG(bij) of the extracted one pixel are "0", then it is determined that the attribute is image.

In the case where the attribute is image (Step P4: YES), then the image extension conversion unit 2 proceeds to BTC extension processing (Step P5). Meanwhile, in the case where the attribute is not image (Step P4: NO), the image extension conversion unit 2 proceeds to fallback extension processing (Step P6).

After Step P5 or Step P6, the image extension conversion unit 2 outputs the decoded 2×2 pixels aij (1200 dpi, 8 bit) (Step P7).

Subsequently, the image extension conversion unit 2 allows the 4-bit attribute data TAG(bij), which has accompanied the one pixel bij (600 dpi) before being decoded, to accompany positions of the respective pixels aij, which are the 2×2 pixels before being decoded, one bit by one bit, and then converts the 4-bit attribute data TAG(bij) concerned into attribute data corresponding to the respective pixels which are the 2×2 pixels (1200 dpi) (Step P8).

For example, the value of the uppermost bit (third bit) of the attribute data TAG(b00) is converted to attribute data of a00, the value of the second bit is converted to attribute data of a01, the value of the first bit is converted to attribute data of a10, and the value of the zero-th bit is converted to attribute data of a11.

Subsequently, the image extension conversion unit 2 determines whether or not to have implemented the extension processing for all of the 4×4 pixels bij taken as the processing target (Step P9). In the case where unprocessed pixels bij are present (Step P9: NO), the image extension conversion unit 2 returns to Step P3, and repeats the processing of Steps P3 to P9 for one pixel in the unprocessed pixels bij, which is taken as a new processing target. Meanwhile, in the case where the processing is performed for all of the 4×4 pixels bij (Step P9: YES), then the image extension conversion unit 2 determines whether or not the extension processing is ended to the terminal end of the image (Step P10).

In the case where an unprocessed image portion is present (Step S10: NO), the image extension conversion unit 2 returns to Step P1, and newly extracts the 4×4 pixels from the unprocessed image portion, and repeats the processing of Steps P1 to P10. Then, when the extension processing is performed to the terminal end of the image (Step P10: YES), then this processing is ended.

Figure 20:
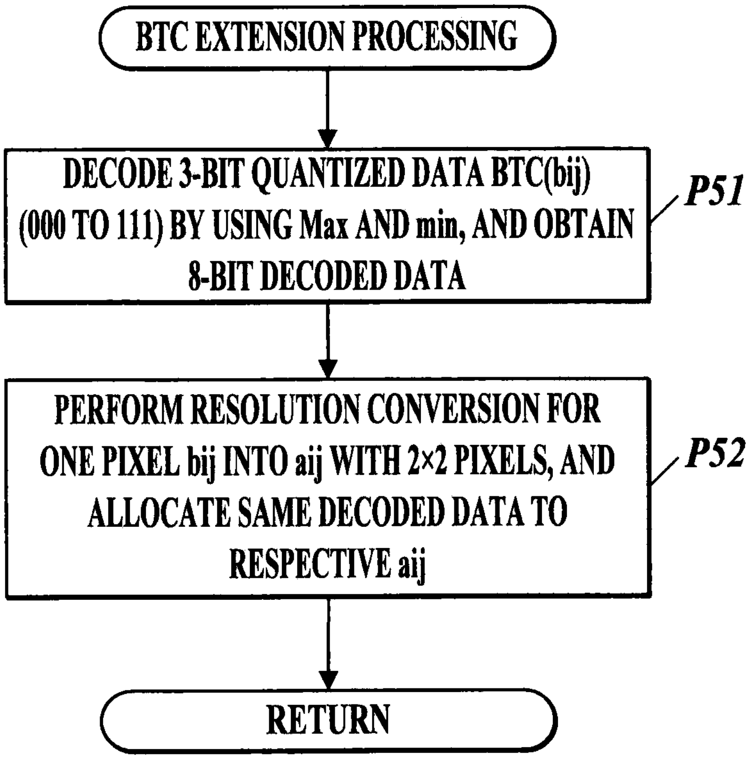
FIG. 20 is a flowchart showing BTC extension processing.

A description is made of the BTC extension processing with reference to FIG. 20.

As shown in FIG. 20, the image extension conversion unit 2 decodes the 3-bit quantized data BTC(bij) by using the maximum values Max and the minimum values min, which are restored in Step P2, and then obtains 8-bit decoded data (Step P51). At this time, the image extension conversion unit 2 divides the one pixel bij into the 2×2 pixels aij, performs the resolution conversion therefor, and individually allocates the 8-bit decoded data to the 2×2 pixels aij concerned (Step P52). That is to say, all of decoded data values of the 2×2 pixels aij after being decoded become the same value.

FIG. 9 shows relationships between the quantized data BTC(bij) and the decoded data, and the relationships are represented as in the following expressions.

Figure 21:
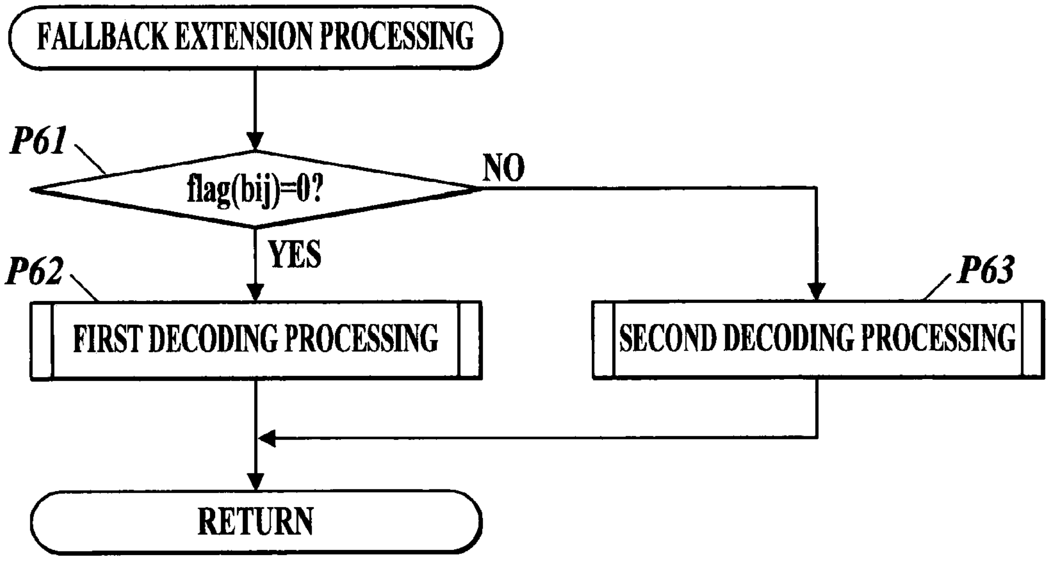
FIG. 21 is a flowchart showing fallback extension processing.

When BTC(bij)=111, then aij=Max
When BTC(bij)=110, then aij=min+(Max−min)×12/14
When BTC(bij)=101, then aij=min+(Max−min)×10/14
When BTC(bij)=100, then aij=min+(Max−min)×8/14
When BTC(bij)=011, then aij=min+(Max−min)×6/14
When BTC(bij)=010, then aij=min+(Max−min)×4/14
When BTC(bij)=001, then aij=min+(Max−min)×2/14
When BTC(bij)=000, then aij=min Next, a description is made of the fallback extension processing with reference to FIG. 21.

As shown in FIG. 21, the image extension conversion unit 2 obtains the identification data flag(bij) held in the identification plane for the pixel of interest bij. Then, in the case of flag(bij)=0 (Step P61: YES), the image extension conversion unit 2 determines that the pixel of interest bij is in the halftone region, and executes first decoding processing therefor (P62).

Meanwhile, in the case of flag(bij))=1 (Step P61: NO), the image extension conversion unit 2 determines that the pixel of interest bij is the high resolution region, and executes second decoding processing therefor (Step P63).

Figure 22:
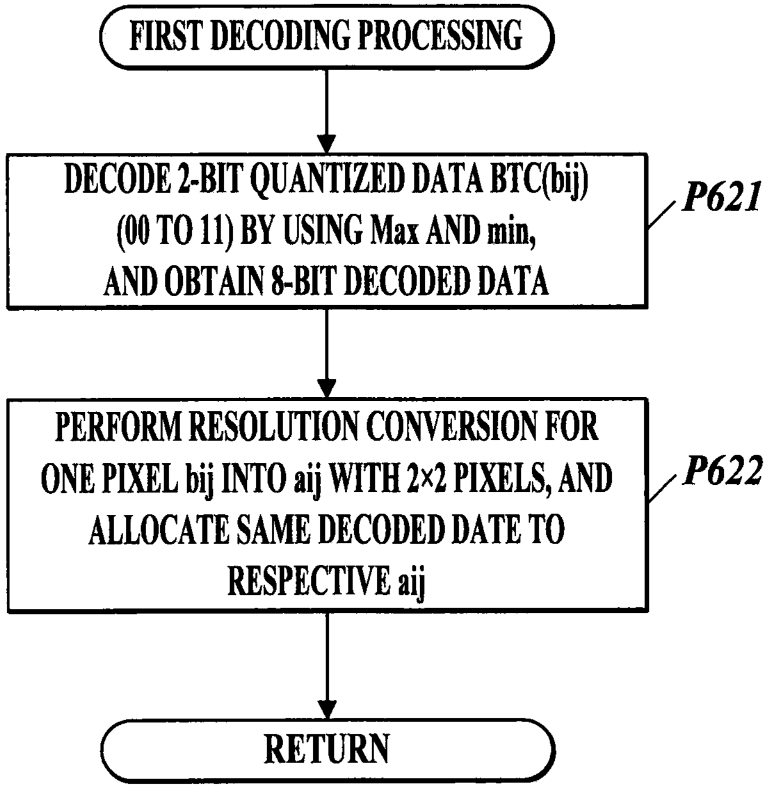
FIG. 22 is a flowchart showing first decoding processing.

A description is made of the first decoding processing with reference to FIG. 22.

In the first decoding processing, the quantized data BTC (bij) is decoded by a decoding method corresponding to the quantization method used in the first quantization processing.

As shown in FIG. 22, the image extension conversion unit 2 decodes the 2-bit quantized data BTC(bij) by using the restored maximum values Max and minimum values min, and then obtains the 8-bit decoded data (Step P621). At this time, the image extension conversion unit 2 divides the one pixel bij into the 2×2 pixels aij, performs the resolution conversion therefor, and individually allocates the 8-bit decoded data to the 2×2 pixels (Step P622). That is to say, all of decoded data values of the 2×2 pixels aij after being decoded become the same value.

FIG. 14 shows relationships between the quantized data BTC(bij) and the decoded data, and the relationships are represented as in the following expressions.

When BTC(bij)=11, then aij=Max

When BTC(bij)=10, then aji=min+(Max−min)×2/3

When BTC(bij)=01, then aji=min+(Max−min)×1/3

When BTC(bij)=00, then aij=min

Figure 23:
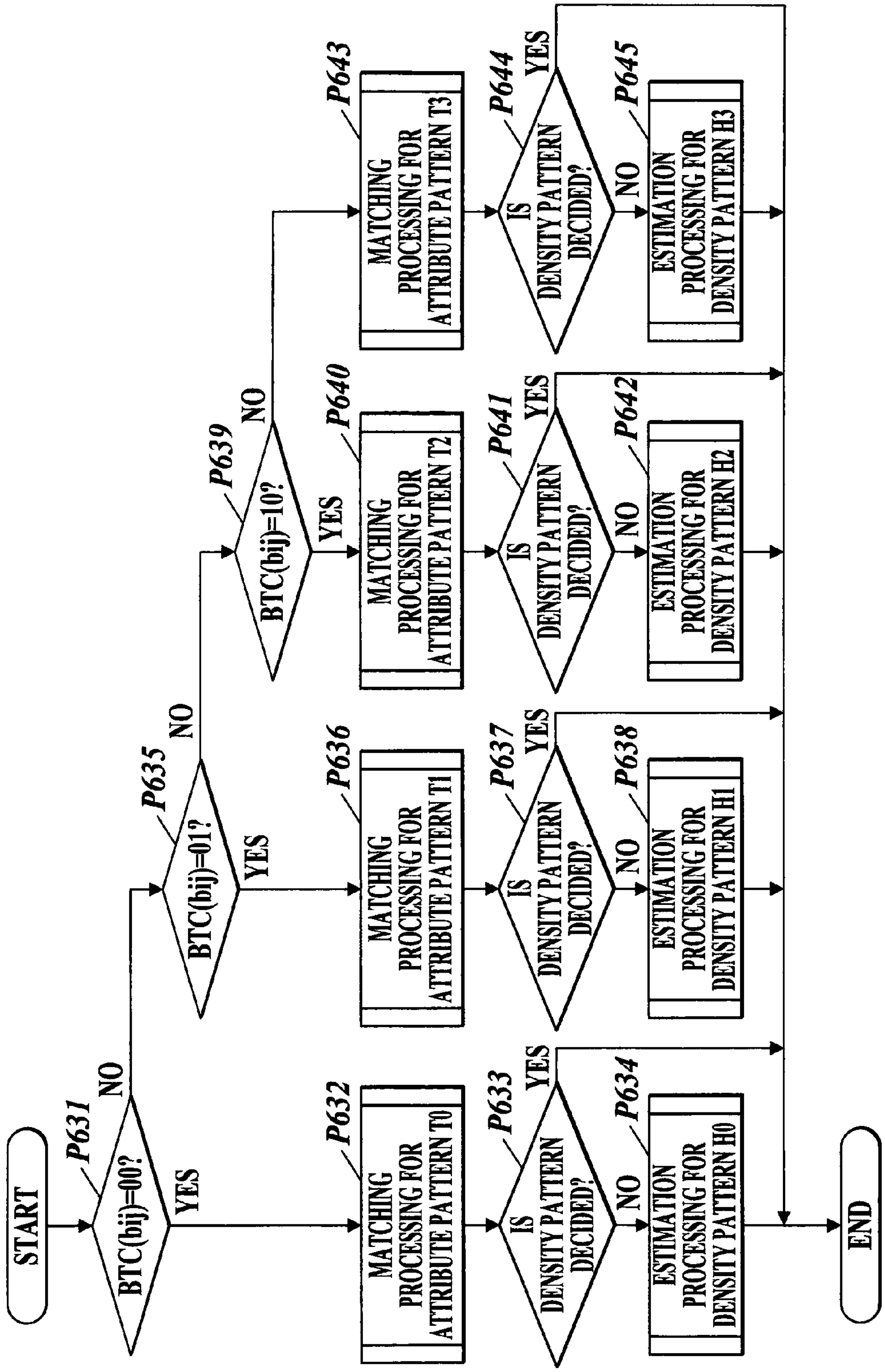
FIG. 23 is a flowchart showing second decoding processing.

Next, a description is made of the second decoding processing with reference to FIG. 23.

In the second decoding processing, the quantized data BTC (bij) is decoded by a decoding method corresponding to the quantization method used in the second quantization processing.

Figure 24:
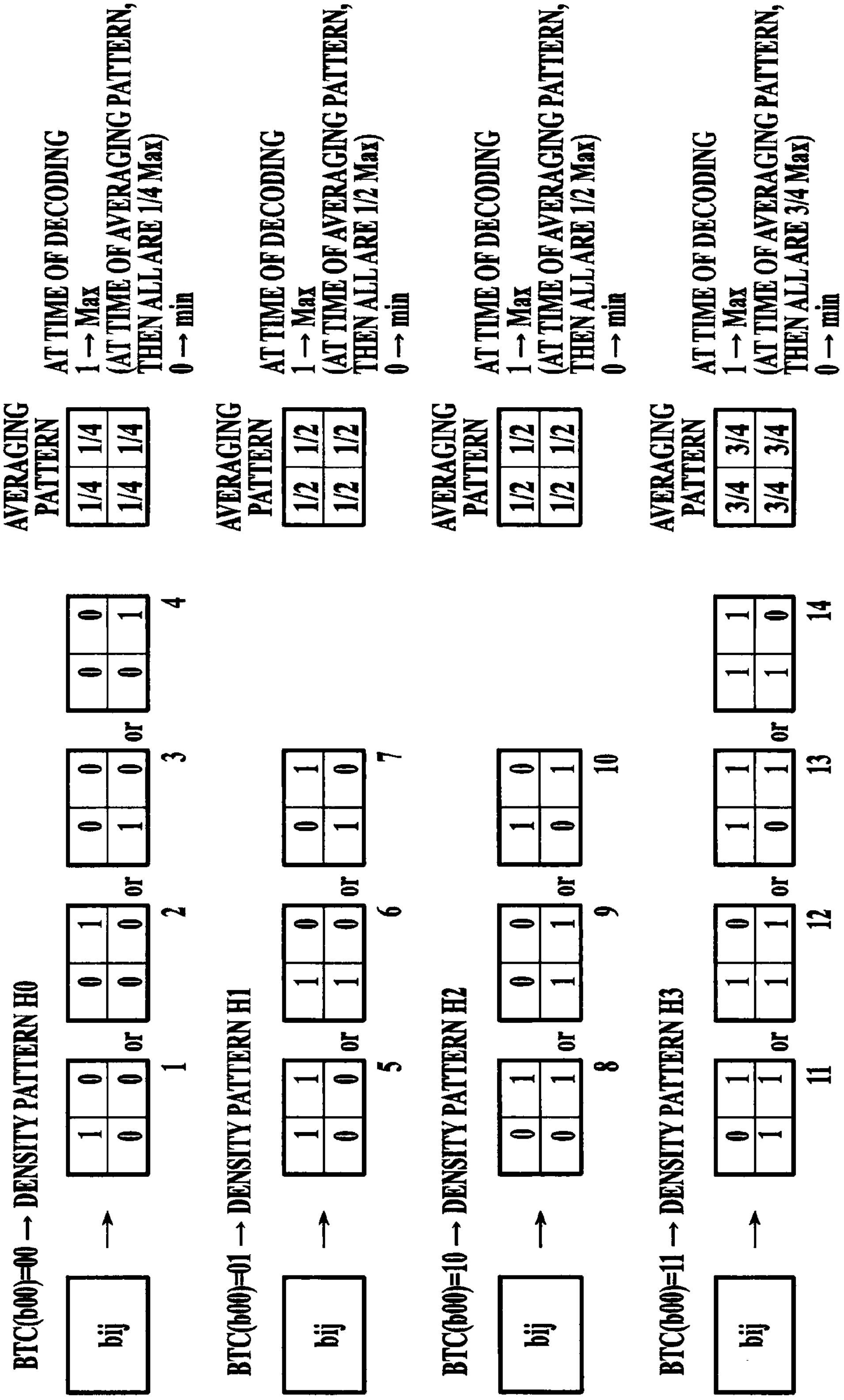
FIG. 24 is a view showing relationships between the quantized data and density patterns estimated from the quantized data.

In the second quantization processing, the data values (00 to 11) of the quantized data BTC(bij) are allocated in response to the group classification of the density patterns in which the two values which are 1 and 0 are arranged. Accordingly, in the event of decoding the data concerned to the original 8-bit data, some density patterns (density patterns of pattern numbers 1 to 14 in FIG. 24) are conceived depending on the data values of the quantized data BTC(bij). Hence, in the second decoding processing, the decoding is performed by estimating how the density pattern in the event of the quantization has been based on the data values of the quantized data BTC(bij) and the attribute data TAG(bij).

As shown in FIG. 23, the image extension conversion unit 2 determines the data values of the quantized data BTC(bij).

In the case of BTC(bij)=00 (Step P631: YES), the image extension conversion unit 2 proceeds to matching processing for an attribute pattern T0 (Step P632). After the matching processing for the attribute pattern T0, the image extension conversion unit 2 determines whether or not the density pattern is decided (Step P633). In the case where the density pattern is not decided (Step P633: NO), the image extension conversion unit 2 proceeds to estimation processing for the density pattern H0 (Step S634).

In the case of BTC(bij)=01 (Step P631: NO, Step P635: YES), the image extension conversion unit 2 proceeds to matching processing for an attribute pattern T1 (Step P636). After the matching processing for the attribute pattern T1, the image extension conversion unit 2 determines whether or not the density pattern is decided (Step P637). In the case where the density pattern is not decided (Step P637: NO), the image extension conversion unit 2 proceeds to estimation processing for the density pattern H1 (Step P636).

In the case of BTC(bij)=10 (Step P631: NO, Step P635: NO, Step P639: YES), the image extension conversion unit 2 proceeds to matching processing for an attribute pattern T2 (Step P640). After the matching processing for the attribute pattern T2, the image extension conversion unit 2 determines whether or not the density pattern is decided (Step P641). In the case where the density pattern is not decided (Step P641: NO), the image extension conversion unit 2 proceeds to estimation processing for the density pattern H2 (Step P642).

In the case of BTC(bij)=11 (Step P631: NO, Step P635: NO, Step P639: NO), the image extension conversion unit 2 proceeds to matching processing for an attribute pattern T3 (Step P643). After the matching processing for the attribute pattern T3, the image extension conversion unit 2 determines whether or not the density pattern is decided (Step P644). In the case where the density pattern is not decided (Step P644: NO), the image extension conversion unit 2 proceeds to estimation processing for the density pattern H3 (Step P645).

Such pieces of the matching processing for the attribute patterns T0 to T3 are different from one another only in the attribute patterns for use in the processing, and processing contents thereof are the same. Accordingly, a description is made here of, as a representative, the matching processing for the attribute pattern T0 with reference to FIG. 25.

In the matching processing for the attribute patterns T0 to T3, the attribute patterns are used for estimating the density pattern. Each of the attribute patterns is a pattern in which a value that is 0 or 1 is determined for the four 2×2 pixels by setting the 4-bit attribute data TAG(bij) at the positions of the respective 2×2 pixels one bit by one bit. The attribute patterns are obtained by forming the attributes of the regions with the 2×2 pixels into patterns. With regard to the attribute patterns, some pieces thereof are conceived depending on the values of the attribute data.

Note that the respective attribute patterns shown in FIG. 25 to FIG. 28 are imparted with numbers (symbols (t1 to t4) shown on lower right portions of the respective attribute patterns) for identifying the respective attribute patterns.

In the matching processing for the attribute pattern T0, the density pattern is decided to be any of the density patterns in the group of the density pattern H0 based on the attribute data. In the matching processing for the attribute pattern T0, an attribute pattern that is based on the attribute data TAG(bij) corresponding to the pixel bij extracted as the pixel of interest is created, and it is determined whether or not the created attribute pattern coincides with any of the attribute patterns shown in FIG. 25. In the case where the created attribute pattern shown in FIG. 25 does not coincide with any of the attribute patterns shown in FIG. 25, the density pattern is not decided in the matching processing for the attribute pattern T0. In the case where the created attribute pattern coincides with any of the attribute patterns shown in FIG. 25, a density pattern corresponding to the coinciding attribute pattern is decided.

When the density pattern is decided, then in the decided density pattern, the value of 1 is replaced by Max, followed by decoding, and the value of 0 is replaced by min, followed by decoding. That is to say, the decoded data values Max and min corresponding to the two values set in the decided density pattern are allocated to the 2×2 pixels aij obtained by performing the resolution conversion for the pixel of interest bij, and the resolution conversion is performed therefor together with the decoding. In the event of forming the density pattern in the second quantization processing, binarization is performed so that the pixels approximate to Max can become 1 and that the pixels approximate to min can become 0. Accordingly, in the 2×2 pixels, even if the pixels aij in which the value of 1 is set are replaced by Max, and the pixels aij in which the value of 0 is set are replaced by min, then a density error between the original image and the restored image is decreased.

Figure 25:
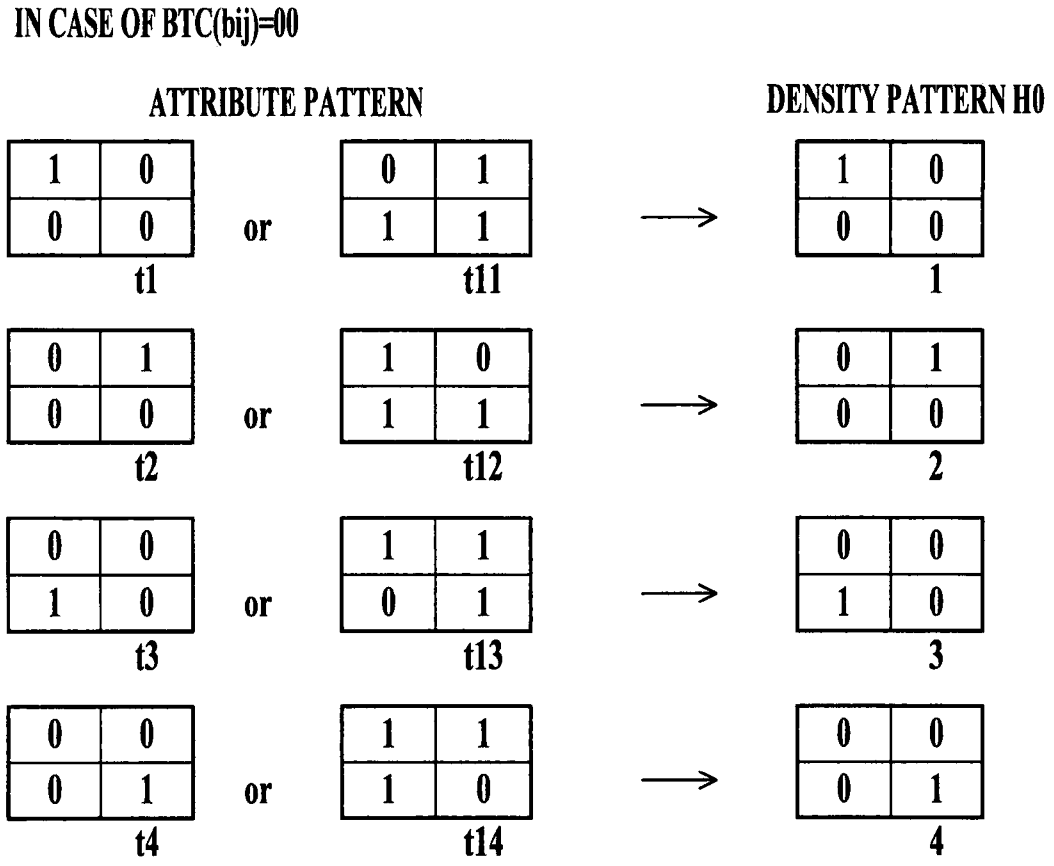
FIG. 25 is a view showing relationships between attribute patterns for use in matching processing for an attribute pattern T0 and density patterns decided from the attribute patterns.

For example, in the case where the coinciding attribute pattern is t1, then the density pattern 1 is decided (refer to FIG. 25). In this density pattern, such 2×2 pixels aij, in which the value of 1 is replaced by Max (8 bit) and the value of 0 is replaced by min (8 bit), becomes the decoded image (1200 dpi, 8 bit).

FIG. 25 is a view showing relationships between attribute patterns for use in the matching processing for the attribute pattern T0 in the case of BTC(bij)=00 and density patterns to be decided in the case of coinciding with the attribute patterns concerned. In FIG. 25, in the case where the attribute pattern that is based on the attribute data TAG(bij) coincides with an attribute pattern of the attribute pattern number t1 or t11, then the density pattern is decided to be the density pattern of the pattern number 1. In the case where the attribute pattern concerned coincides with an attribute pattern of the attribute pattern number t2 or t12, the density pattern is decided to be the density pattern of the pattern number 2. In the case where the attribute pattern concerned coincides with an attribute pattern of the attribute pattern number t3 or t13, the density pattern is decided to be the density pattern of the pattern number 3. In the case where the attribute pattern concerned coincides with an attribute pattern of the attribute pattern number t4 or t14, the density pattern is decided to be the density pattern of the pattern number 4.

Note that the attribute patterns of the attribute pattern numbers t11 to t14 are inverted patterns of the attribute pattern numbers t1 to t4.

Figure 26:
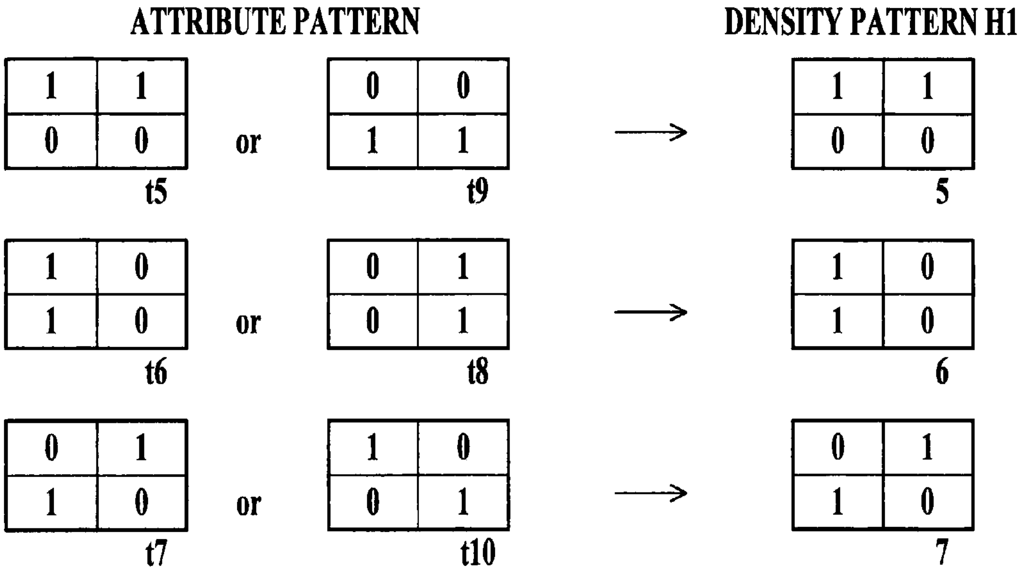
FIG. 26 is a view showing relationships between attribute patterns for use in matching processing for an attribute pattern T1 and density patterns decided from the attribute patterns.
Figure 27:
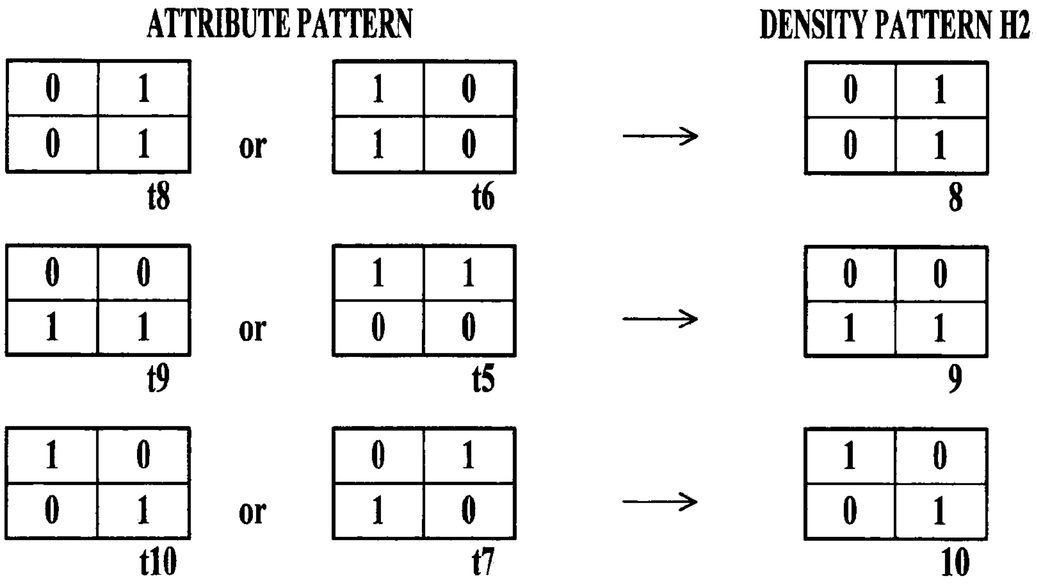
FIG. 27 is a view showing relationships between attribute patterns for use in matching processing for an attribute pattern T2 and density patterns decided from the attribute patterns.
Figure 28:
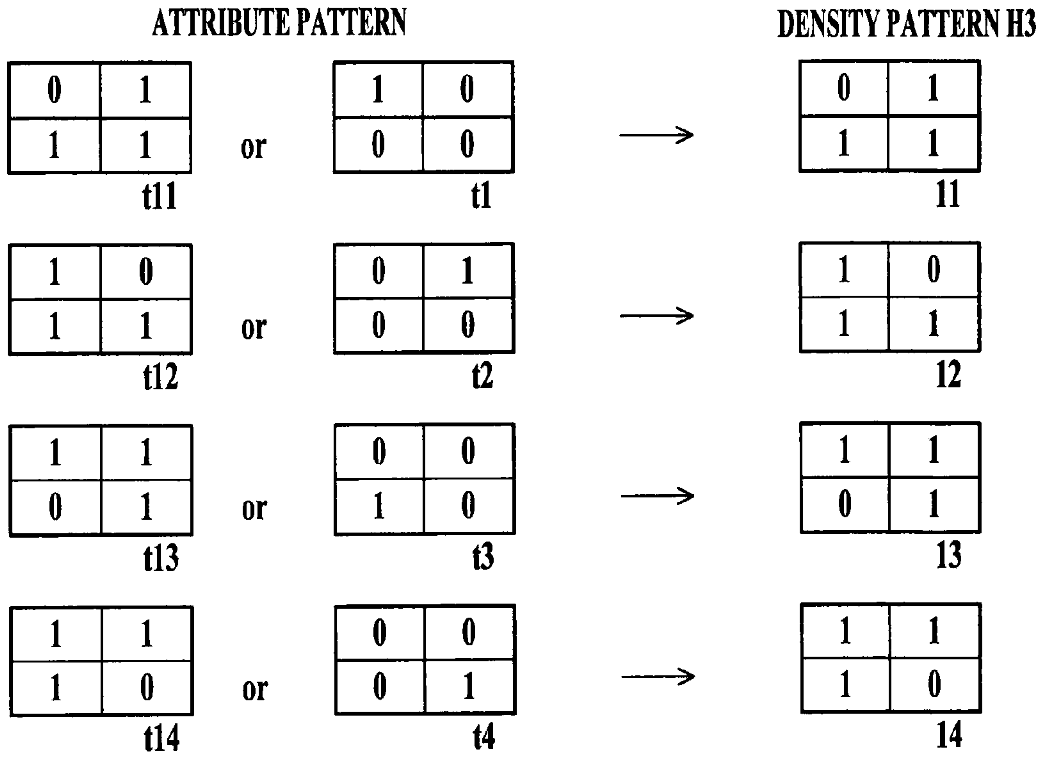
FIG. 28 is a view showing relationships between attribute patterns for use in matching processing for an attribute pattern T3 and density patterns decided from the attribute patterns.

FIG. 26 is a view showing relationships between attribute patterns for use in the matching processing for the attribute pattern T1 in the case of BTC(bij)=01 and density patterns to be decided in the case of coinciding with the attribute patterns concerned. FIG. 27 is a view showing relationships between attribute patterns for use in the matching processing for the attribute pattern T2 in the case of BTC(bij)=10 and density patterns to be decided in the case of coinciding with the attribute patterns concerned. FIG. 28 is a view showing relationships between attribute patterns for use in the matching processing for the attribute pattern T3 in the case of BTC(bij)=11 and density patterns to be decided in the case of coinciding with the attribute patterns concerned.

Next, a description is made of the estimation processing for the density patterns H0 to H3.

Such pieces of the estimation processing for the density patterns H0 to H3 are different from one another only in templates for use in the processing, and processing contents thereof are the same. Accordingly, a description is made here of, as a representative, the estimation processing for the density pattern H0 with reference to FIG. 29.

In the estimation processing for the density patterns H0 to H3, templates are used in order to estimate the density patterns H0 to H3.

Figure 30:
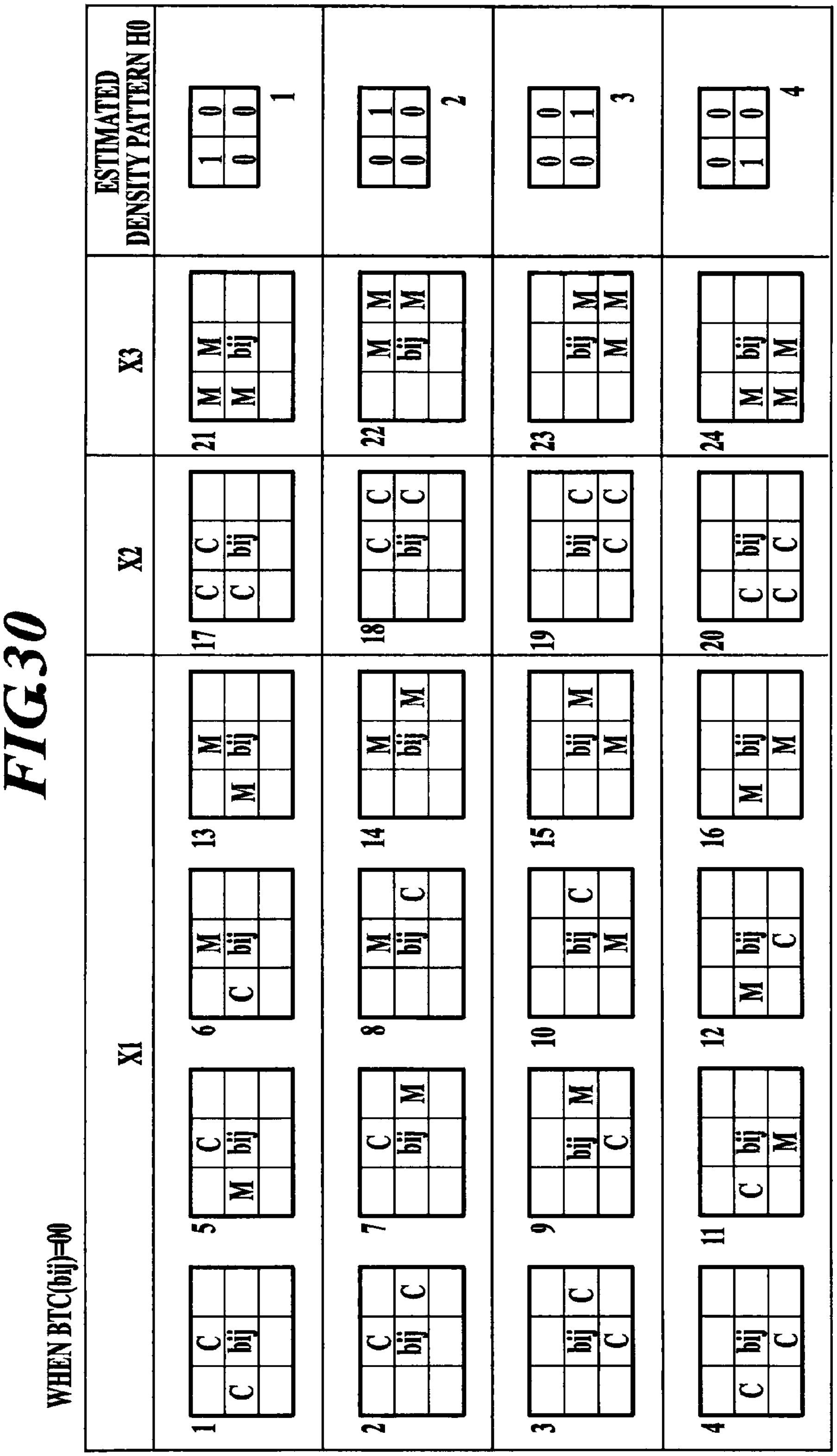
FIG. 30 is a view showing relationships between templates for use in the estimation processing for the density pattern H0 and density patterns estimated in the case of coinciding with the templates.

FIG. 30 is a view showing relationships between the templates for use in estimation processing in the case of BTC(bij)=00, that is, for the density pattern H0 and density patterns to be estimated in the case of coinciding with the templates concerned. The respective templates are imparted with identification numbers (numbers shown on upper left portions of the templates).

Symbols C assigned on the respective templates denote one of coincidence conditions of the templates. Symbols C indicate that, in the case where the attribute data of the pixels located at positions of symbols C is image, one of the coincidence conditions is that a density difference $|C_{den}-bij_{MAX}|$ between each of the pixels located at the positions of symbols C and the pixel of interest bij becomes $|C_{den}-bij_{MAX}|<T_C$. $C_{den}$ is a decoded data value of the pixel located at the position of symbol C. That is to say, the pixel of symbol C is subjected to the BTC compression processing, and accordingly, $C_{den}$ is a decoded data value (decoded data value shown in FIG. 9) by the BTC extension processing. Meanwhile, symbols C indicate that, in the case where the attribute data of the pixel located at the position of symbol C is other than image, one of the coincidence conditions is that the pixel located at the position of symbol C satisfies the conditions (11) to (14), and that the density difference $|C_{den}-bij_{MAX}|$ between the pixel of symbol C and the pixel of interest bij becomes $|C_{den}-bij_{MAX}|<T_C$. That is to say, the pixel of symbol C is quantized by the first quantization processing, and accordingly, $C_{den}$ is a decoded data value (decoded data value shown in FIG. 14) by the first decoding processing. $bij_{MAX}$ is the maximum density value Max in the processed region with the 4×4 pixels to which the pixel of interest bij belongs.

Moreover, symbols M assigned on the respective templates denote one of the coincidence conditions of the templates. Symbols M indicate that one of the coincidence conditions is that the attribute data of the pixels located at positions of symbols M is other than image, that the pixels located at the positions of symbols M satisfy the condition (15), and that a density difference $|M_{MAX}-bij_{MAX}|$ between each of the pixels located at the positions of symbols M and the pixel of interest bij becomes $|M_{MAX}-bij_{MAX}|<T_M$. $M_{MAX}$ is the maximum density value Max in the processed region with the 4×4 pixels to which the pixel of symbol M belongs. In the case where the pixel of symbol M and the pixel of interest bij belong to the same processed region, then $M_{MAX}=bij_{MAX}=$Max is established, and accordingly, the density difference therebetween is 0.

Note that $T_C$ and $T_M$ are threshold values for determining whether or not the density difference is small, and are settable as appropriate. For example, $T_C$ and $T_M$ can be set as: $T_C=30$; $T_M=35$, and the like. As described above, $T_C$ and $T_M$ may be set at different values, or alternatively, may be set at the same value. The densities of the pixels are compared with the threshold values $T_C$ and $T_M$, whereby a density pattern is estimated, in which the density difference is small, that is, the densities of the pixel at the position of symbol C or M and of the pixel of interest bij become substantially equal to each other.

Figure 31:
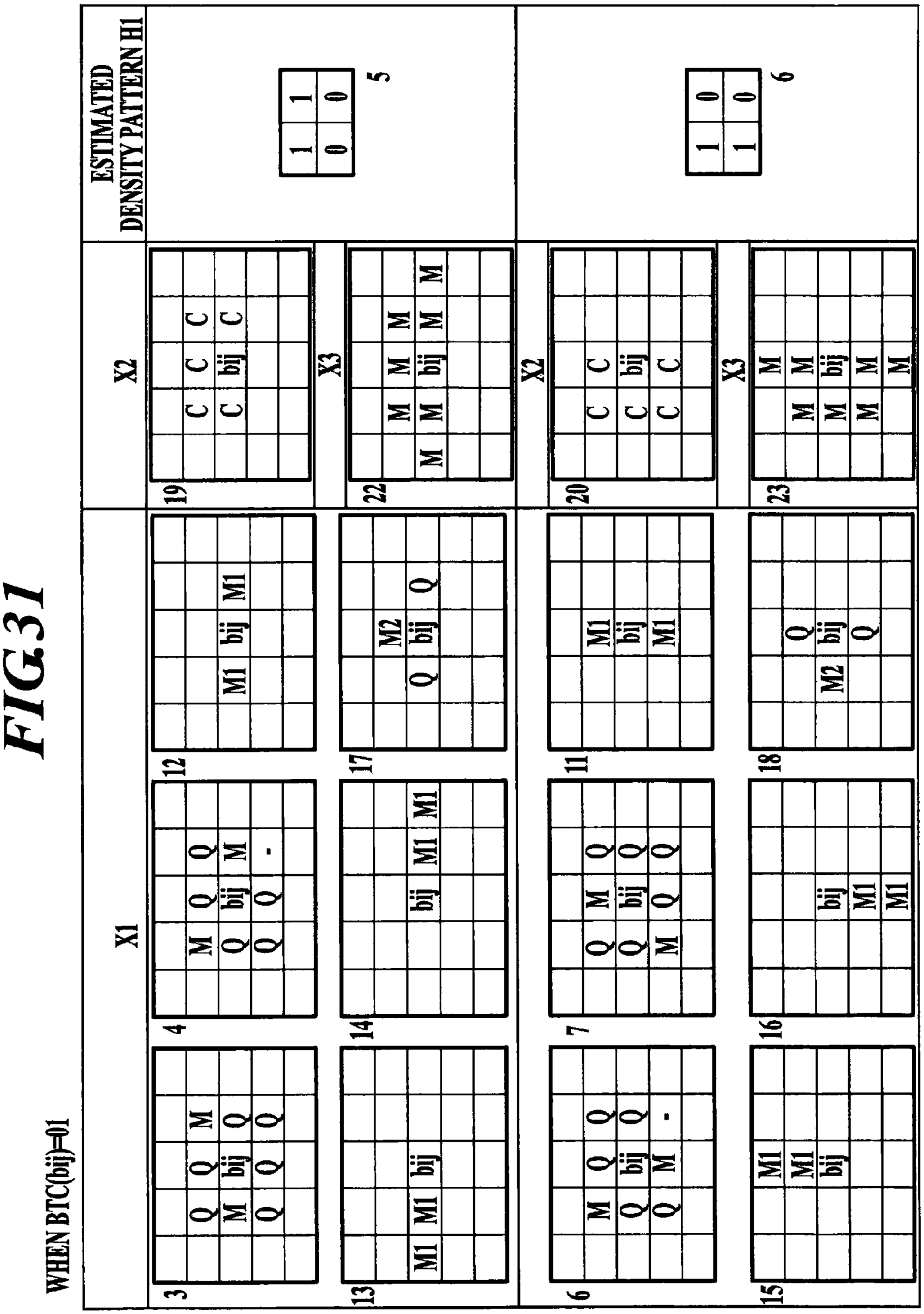
FIG. 31 is a view showing relationships between templates for use in estimation processing for a density pattern H1 and density patterns estimated in the case of coinciding with the templates.
Figure 32:
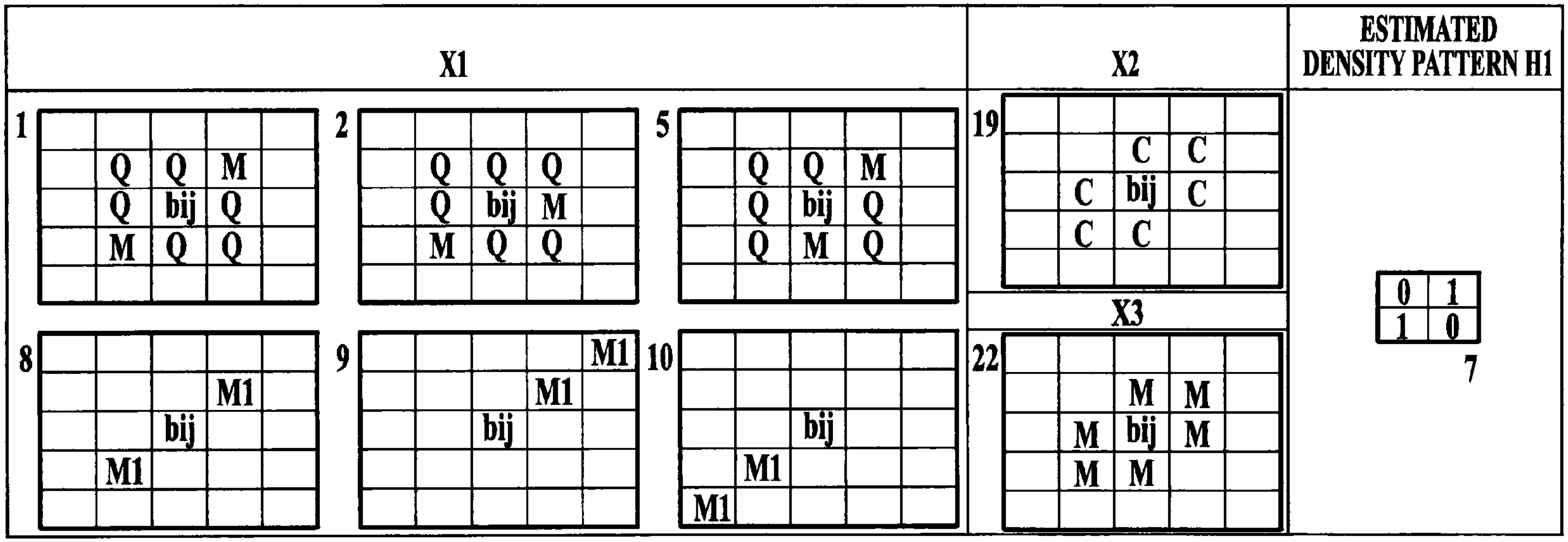
FIG. 32 is a view showing relationships between templates for use in the estimation processing for the density pattern H1 and density patterns estimated in the case of coinciding with the templates.

FIG. 31 and FIG. 32 are views showing relationships between templates for use in estimation processing in the case of BTC(bij))=01, that is, for the density pattern H1 and density patterns to be estimated in the case of coinciding with the templates concerned.

Figure 33:
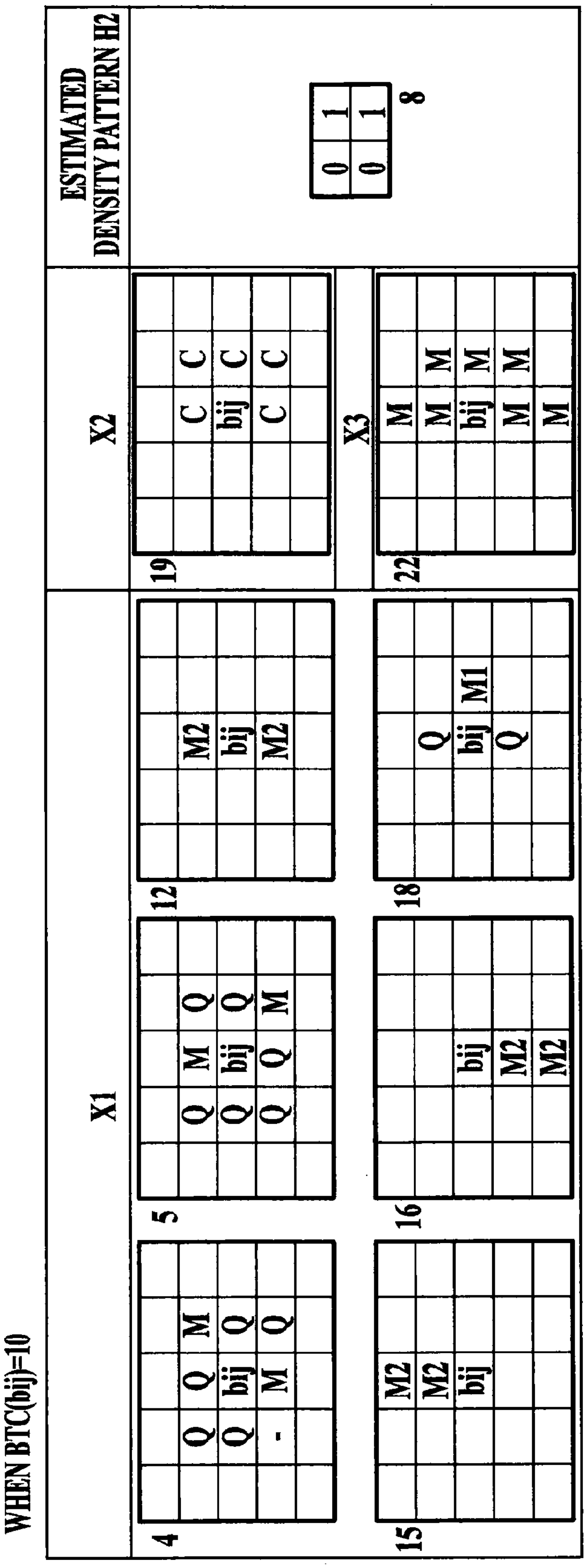
FIG. 33 is a view showing relationships between templates for use in estimation processing for a density pattern H2 and density patterns estimated in the case of coinciding with the templates.
Figure 34:
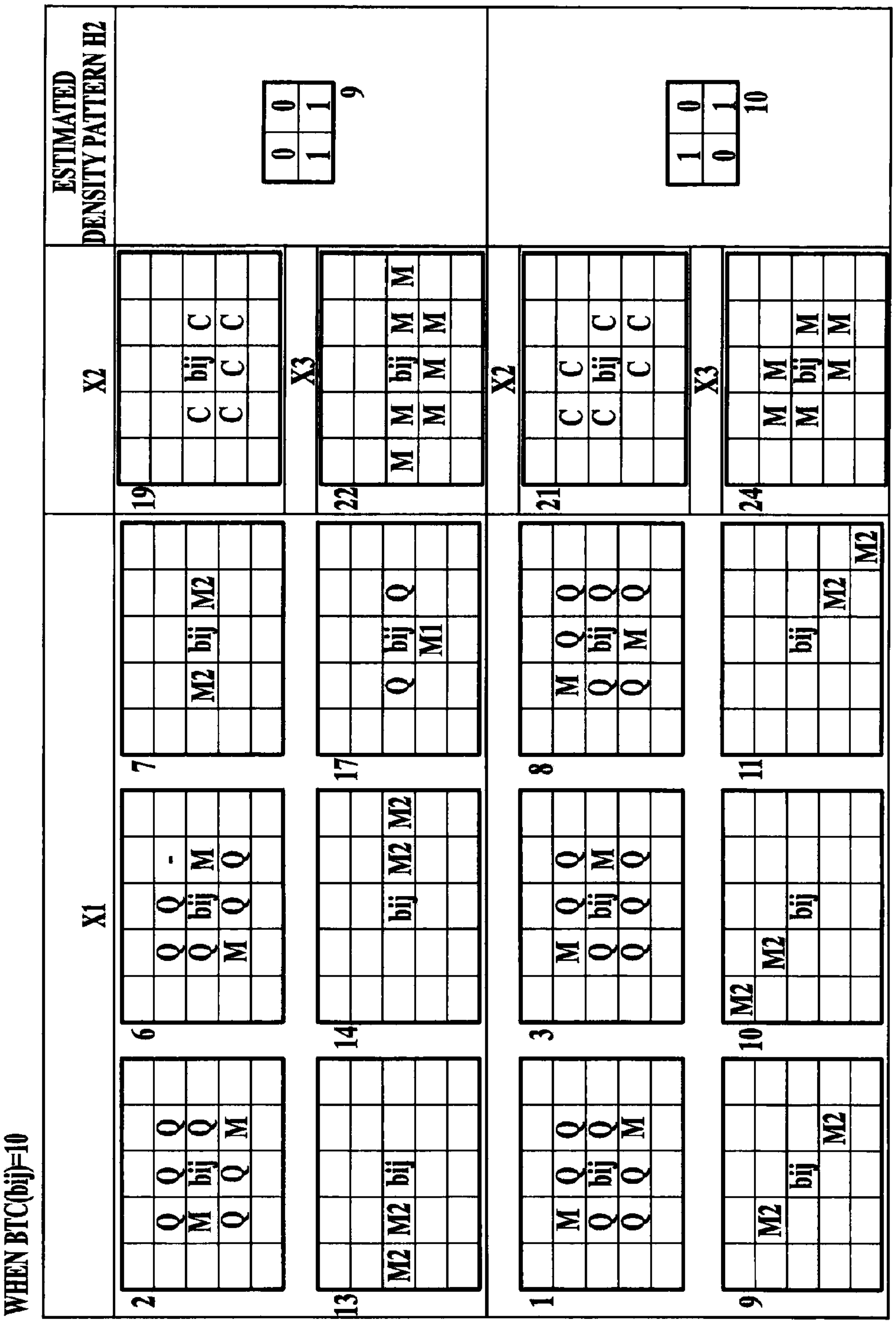
FIG. 34 is a view showing relationships between templates for use in the estimation processing for the density pattern H2 and density patterns estimated in the case of coinciding with the templates.

FIG. 33 and FIG. 34 are views showing relationships between templates for use in estimation processing in the case of BTC(bij))=10, that is, for the density pattern H2 and density patterns to be estimated in the case of coinciding with the templates concerned.

Figure 35:
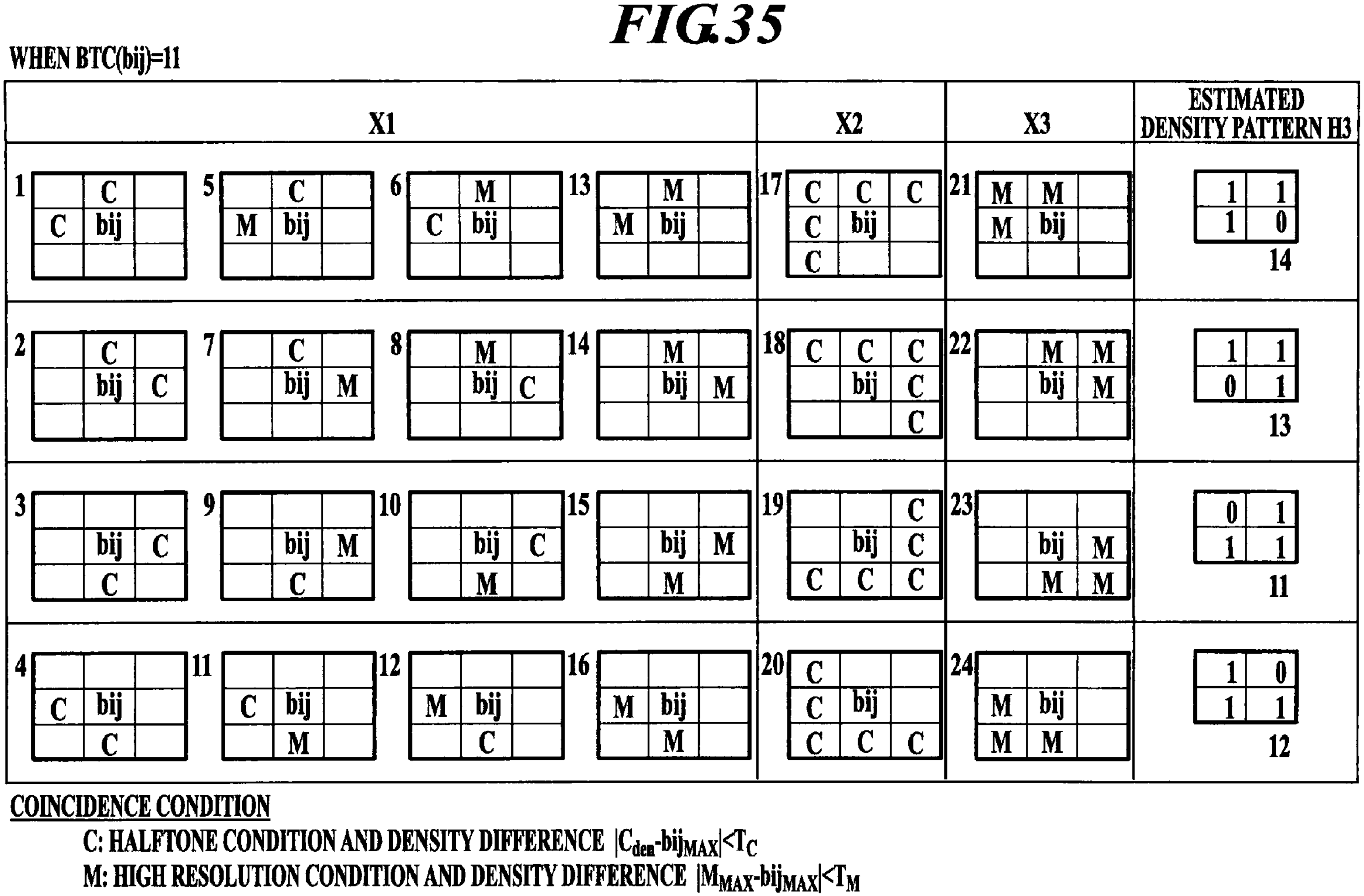
FIG. 35 is a view showing relationships between templates for use in estimation processing for a density pattern H3 and density patterns estimated in the case of coinciding with the templates.

FIG. 35 is a view showing relationships between templates for use in estimation processing in the case of BTC(bij)=11, that is, for the density pattern H3 and density patterns to be estimated in the case of coinciding with the templates concerned.

In FIG. 31 to FIG. 35, symbols M1 and M2 and Q are coincidence conditions of the templates. Symbol M1 indicates that one of the coincidence conditions is that pixels located at symbol M1 satisfy the above-described symbol M, and applies to the density pattern H1. That is to say, the condition is that the attribute data of the pixels of symbol M1 is other than image, and that the pixels of symbol M1 is BTC(bij)=01. Symbol M2 indicates that one of the coincidence conditions is that pixels located at symbol M2 satisfy the above-described symbol M, and applies to the density pattern H2. That is to say, the condition is that the attribute data of the pixels of symbol M2 is other than image, and that the pixels of symbol M2 is BTC(bij)=10. Symbol Q indicates that one of the coincidence conditions is that pixels located at symbol Q do not satisfy any of the conditions of symbols C, M, M1 and M2.

The respective templates are classified into three groups which are X1, X2 and X3. This is for the purpose of performing the estimation at three stages.

In the case where all of the conditions in symbols C, M and the like, which are assigned in the template for the density pattern, are satisfied, it is determined that the density pattern coincides with the template of the X1 group. Meanwhile, not in the case where all of the conditions in symbols C, M and the like, are satisfied, but in the case where a fixed evaluation is obtained when to which extent these conditions are satisfied is evaluated, then it is determined that such density patterns coincide with the templates of the X2 and X3 groups. For example, in the case of the template of the X2 group, collation is once performed with regard to all of template groups of the X2 group, and with regard to each of the templates, the number of pixels which satisfy the conditions in symbols C, M and the like is counted, and the counted number is defined as an evaluation value. Then, it is determined that the density pattern coincides with the template in which the evaluation value thus obtained becomes the maximum.

These templates are designed in order to estimate the density pattern of the pixel of interest bij from the shape of the edge, the hairline structure and the like, which are included in the original image. A structure for which the high resolution of the edge shape, the hairline structure and the like is desired to be maintained can be specified from a density pattern of peripheral pixels of the pixel of interest bij. Accordingly, in each of the templates, conditions of the peripheral pixels when such a structure is formed are defined as the conditions of symbols C, M and the like.

In particular, the X1 group includes a template group designed so as to be capable of estimating a density pattern of the case where the pixel of interest bij is a pixel of the hairline structure for which the high resolution is particularly desired to be maintained. Each of the X2 and X3 group includes a template group in which coincidence conditions looser than in the X1 group are set so that the density pattern of the case where the edge shape and the like are formed can be widely estimated.

Figure 36A:
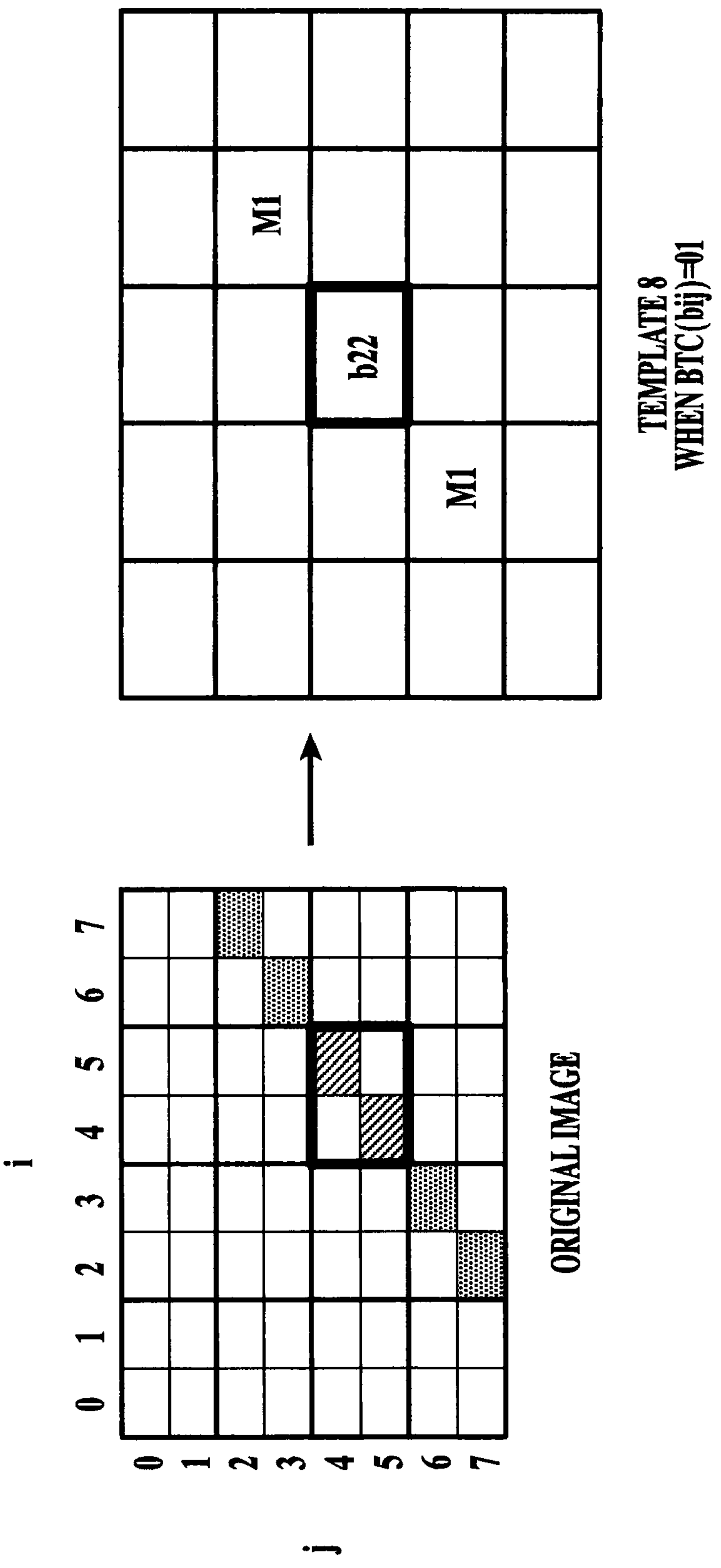
FIG. 36A is a view showing an original image and a template for use in the estimation.

For example, as shown in FIG. 36A, in the case where an image of an oblique line with a width of 1 dot is included in an original image of pixels a00 to a77, then in standard fallback compression processing, four pixels a44, a45, a 54 and a55 satisfy the condition (2), and apply to the density pattern H1. Accordingly, a pixel b22 of the processed image, which corresponds to these four pixels, is quantized to BTC(b22)=01. Then, at the time of decoding, from a density pattern of b12 and b31 (upper right and lower left portions of the pixel of interest b22) as the peripheral pixels, it can be estimated that, in the pixel b22, dots are arrayed with a width of one bit and so as to be coupled to dots formed of the pixels b13 and b31, and estimated that densities of these dots are substantially the same. Hence, for the purpose of estimating such a density pattern as described above, a template 8 is designed (refer to FIG. 32), in which the condition of M1 is determined in the peripheral pixel as shown in FIG. 36A.

Figure 36B:
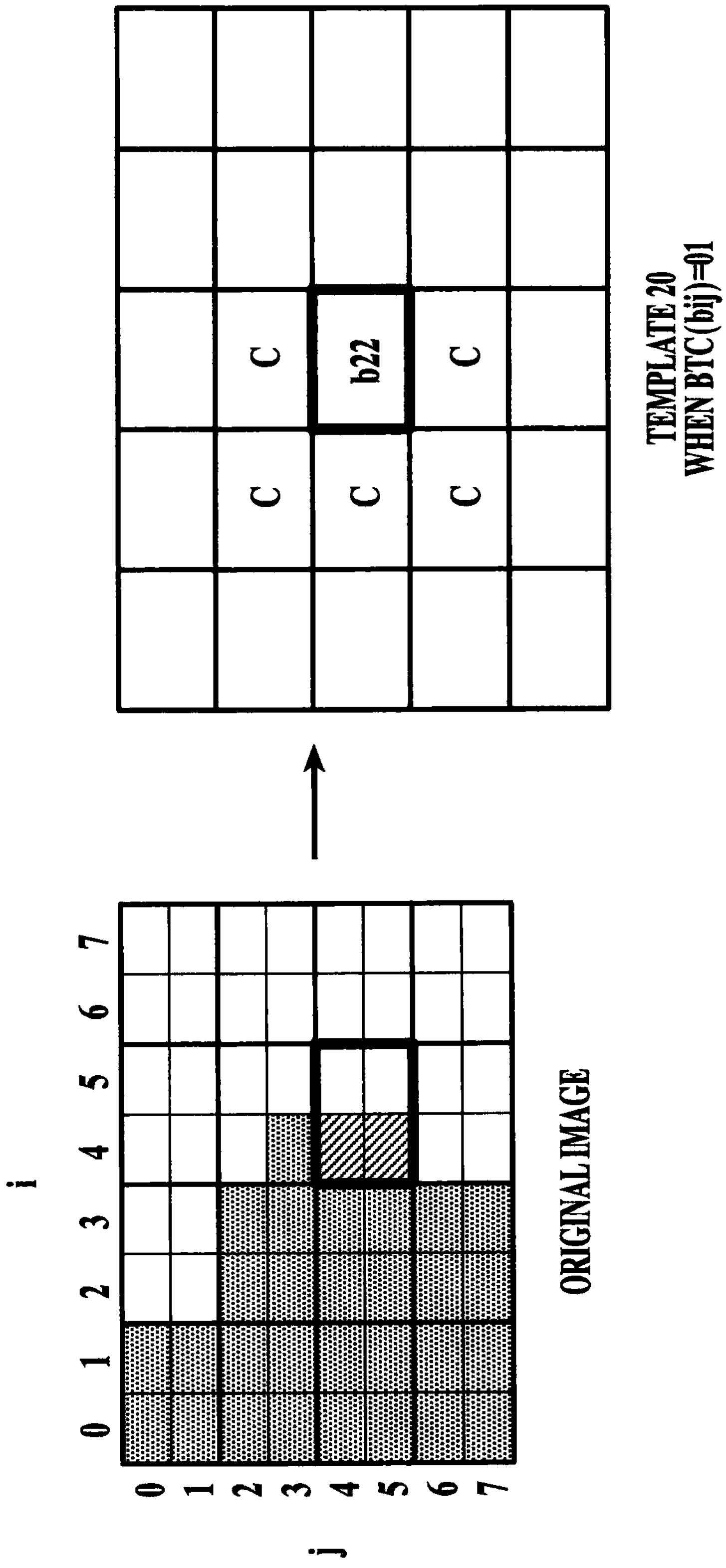
FIG. 36B is a view showing an original image and a template for use in the estimation.

Moreover, as shown in FIG. 36B, in the case of an original image in which an edge of an image having a certain density is included, then pixels a44, a45, a54 and a55 apply to the density pattern H1. For the purpose of estimating a density pattern in such an edge shape at the time of decoding, a template 20 is designed (refer to FIG. 31), in which the condition C is determined in peripheral pixels of the pixel b22 of the processed image, which correspond to the pixels a44, a45, a54 and a55 as shown in FIG. 36B. The template 20 is a template of the X2 group. In the original image, (a24, a25, a34, a35) corresponding to pixels immediately above the pixel of interest b22 satisfy the condition (2), and accordingly, do not satisfy the condition of symbol C immediately above the pixel b22. However, (a22, a32, a23, a33), (a24, a34, a25, a35) and (a26, a36, a27, a37), which correspond to three pixels on a left side of the pixel b22, satisfy the condition of symbol c. Therefore, the evaluation value is increased, and surely, there is increased a possibility that the density pattern may coincide with this template 20.

Note that, for the purpose of performing weighting evaluation, weighting coefficients may be set in the templates of the X2 and X3 groups. For example, in the case of the original image shown in FIG. 36B, if all of the three pixels located on the left side of the pixel of interest b22 satisfy the condition of symbol C, then it is highly possible that the pixel of interest b22 may have a density pattern in which left-side two pixels among the 2×2 pixels have a value of 1. Hence, when it is assumed that, with regard to the coincidence condition C set for the three pixels located on the left side of the pixel of interest b22 of the template 20, for example, a weighting coefficient such as double is set in advance, and the condition of symbol C is satisfied at these three pixel portions, then the evaluation value concerned just needs to be set at a value obtained by being multiplied by the weighting coefficient. In such a way, a coincidence rate with the template can be adjusted.

The templates shown in FIG. 30 to FIG. 35 are for the purpose of illustration only. The templates just need to be designed as appropriate in response to the edge shape and the like, which are conceived to be included in the original image.

Figure 29:
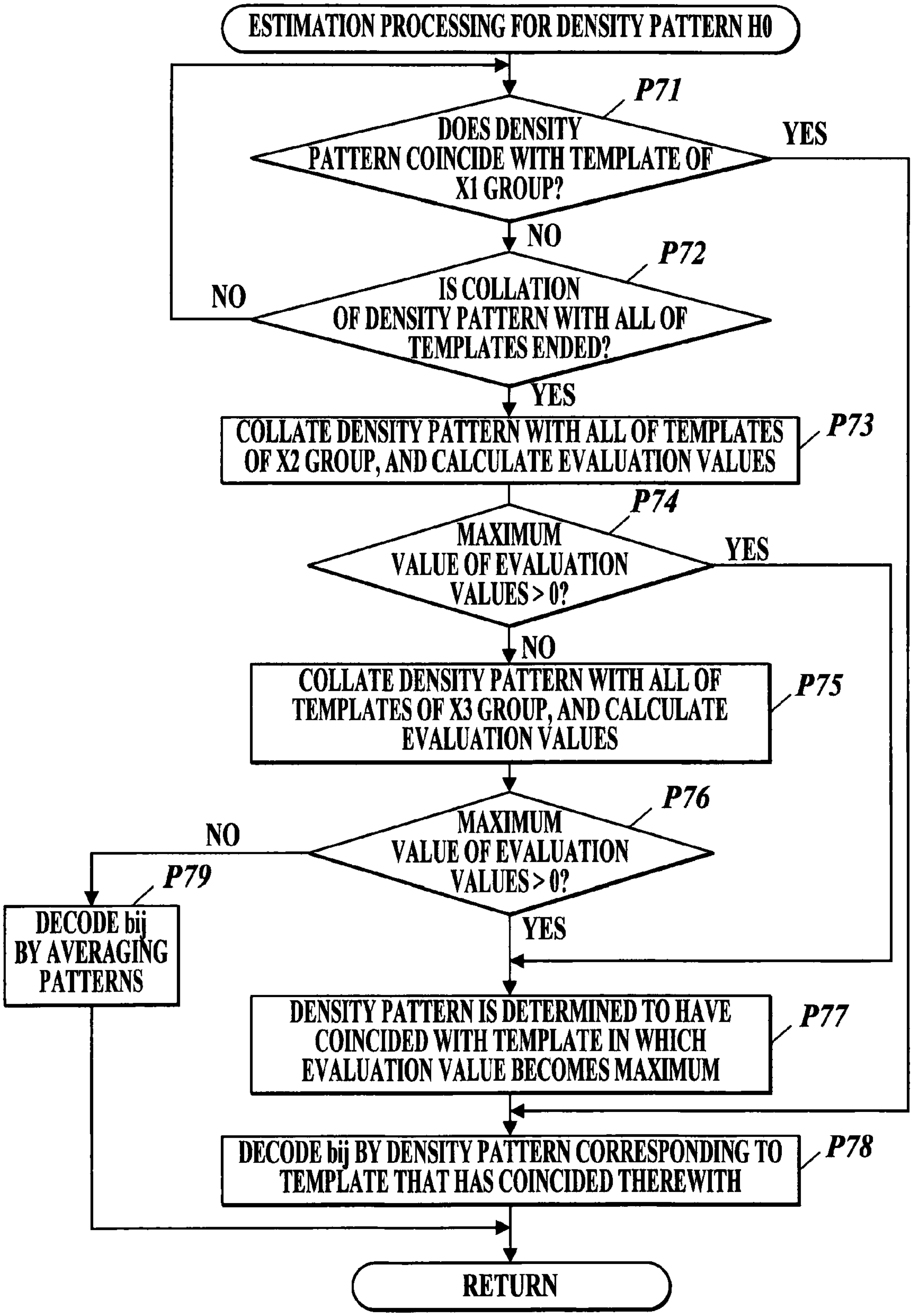
FIG. 29 is a flowchart showing estimation processing for a density pattern H0.

By referring to FIG. 29, a description is made of the estimation processing using the above-described templates.

As shown in FIG. 29, the image extension conversion unit 2 collates the density pattern with one of the templates of the X1 group so that center positions of the pixel of interest bij and the template can coincide with each other. In the case where the density pattern coincides with the collated template (Step P71: YES), the image extension conversion unit 2 estimates the density pattern by the template that has coincided therewith. Then, the image extension conversion unit 2 decodes the pixel of interest bij in response to the estimated density pattern (Step P78).

The image extension conversion unit 2 replaces the value of 1 in the estimated density pattern by Max, followed by decoding, and replaces the value of 0 therein by min, followed by decoding. That is to say, the image extension conversion unit 2 allocates the decoded data values Max and min, which correspond to the two values set in the estimated density pattern, to the 2×2 pixels aij obtained by performing the resolution conversion for the pixel of interest bij, and performs the resolution conversion therefor together with the decoding. In the case of forming the region (pixels) into the density pattern in the second quantization processing, the pixels approximate to Max are binarized to 1 and the pixels approximate to min are binarized to 0. Accordingly, in the 2×2 pixels, even if the pixels aij in which the value of 1 is set are replaced by Max, and the pixels aij in which the value of 0 is set are replaced by min, then the density error between the original image and the restored image is decreased.

For example, in the case where the pixel of interest bij is BTC(bij)=00, and the coinciding template is the template 1 (refer to FIG. 30), then the density pattern is estimated, in which the upper left pixel becomes 1, and the others become 0. In this density pattern, the 2×2 pixels aij, in which the value of 1 is replaced by Max (8 bit) and the value of 0 is replaced by min (8 bit), become the decoded image (1200 dpi, 8 bit).

In the case where the density pattern does not coincide with the collated template (Step P71: NO), the image extension conversion unit 2 determines whether or not the collation with all of the templates of the X1 group is ended (Step P72). In the case where the collation with all of the templates is not ended (Step P72: NO), then the image extension conversion unit 2 returns to the processing of Step P71, and repeats the collation with the other templates, which belong to the X1 group, until the density pattern coincides with any of the templates in the X1 group.

In the case where the density pattern does not coincide with any of the templates in the X1 group though is collated with all thereof (Step P72: YES), the image extension conversion unit 2 collates the density pattern with all of the templates belonging to the X2 group, and calculates evaluation values for each of the templates (Step P73). Then, in the case where the maximum value of the evaluation values calculated for the respective templates exceeds 0 (Step P74: YES), then the image extension conversion unit 2 determines that the density pattern coincides with the template in which the evaluation value becomes the maximum value (Step P77). The image extension conversion unit 2 estimates the density pattern by the template determined to have coincided therewith, and decodes the pixel of interest bij in response to the estimated density pattern concerned (Step P78).

Meanwhile, in the case where any of the conditions defined in the templates of the X2 group is not satisfied, and the maximum value of the evaluation values calculated for the respective templates is 0 (Step P74: NO), then, with regard to the pixel of interest bij, the image extension conversion unit 2 collates the density pattern with all of the templates belong to the X3 group, and calculates evaluation values for the respective templates (Step P75). Then, in the case where the maximum value of the evaluation values calculated for the respective templates exceeds 0 (Step P76: YES), then the image extension conversion unit 2 determines that the density pattern coincides with the template in which the evaluation value becomes the maximum value (Step P77). The image extension conversion unit 2 estimates the density pattern by the template determined to have coincided therewith, and decodes the pixel of interest bij in response to the estimated density pattern concerned (Step P78).

In the case where any of the conditions defined in the templates of the X3 group is not satisfied, and the maximum value of the evaluation values calculated for the respective templates is 0 (Step P76: NO), then it is conceived that, in the 2×2 pixels aij, the pixels in which the value of 1 is set forms an image of the isolated point. In this case, it is difficult to estimate the density pattern even if the peripheral pixels are referred to, and accordingly, the image extension conversion unit 2 decodes the pixel of interest bij by using averaging patterns (Step P79).

The averaging patterns are those in which an average value is allocated to each of the 2×2 pixels aij. The averaging patterns are defined for each of the density patterns H0 to H3.

For example, in the case of the density pattern H0, the number of pixels, in which the value of 1 is set in the 2×2 pixels aij, is one, and a density value of Max is outputted by four pixels. Hence, in the averaging pattern corresponding to the density pattern H0, an average value ¼ Max is allocated to the respective 2×2 pixels aij. In a similar way, in each of the density patterns H1 and H2, a density of 2 Max is outputted by four pixels, and in the density pattern H3, a density of 3 Max is outputted by four pixels. Accordingly, averaging patterns are defined, in which values of ½ Max and ¾ Max, which are average values, are allocated to the respective 2×2 pixels.

FIGS. 37A to 37D and FIGS. 38A to 38D show examples of processing results of performing the quantization and the decoding by the fallback compression processing and the fallback extension processing.

Figure 37A:
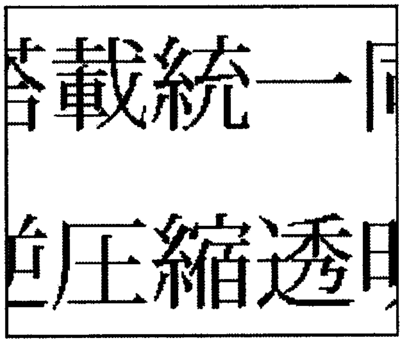
FIGS. 37A, 37B, 37C and 37D are views showing processing results by the fallback compression processing and the fallback extension processing.
Figure 37B:
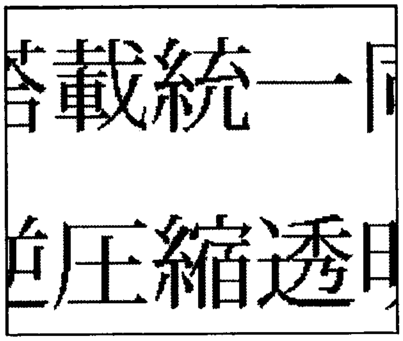
Figure 37C:
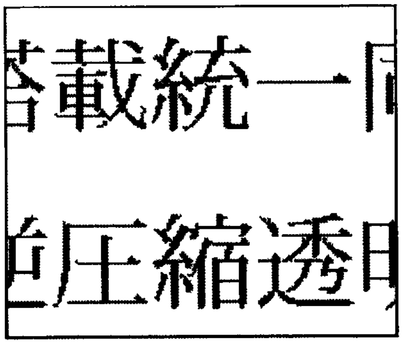
Figure 37D:
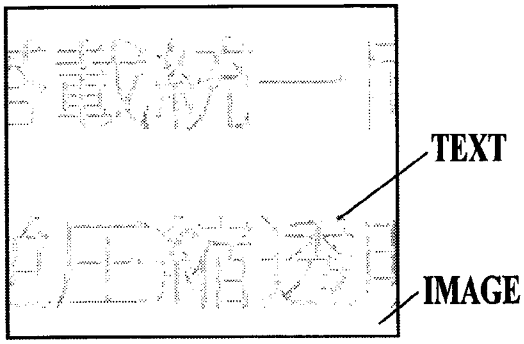

First, a description is made of FIG. 37A to FIG. 37D. FIG. 37A shows an image of Example 1, FIG. 37B shows an image of Example 2, FIG. 37C shows an image of Comparative example, and FIG. 37D shows an image of the attribute data of the original image.

As shown in FIG. 37D, the original image before the compression and extension processing is an 8-bit image with resolution of 1200 dpi in which text is written on a background of an image. In the image of the attribute data, which is shown in FIG. 37*d*, a portion in which the attribute data is the image is displayed white, and a portion in which the attribute data is the text (non-image) is displayed gray.

In Example 1 shown in FIG. 37A, in the compression processing, the 2-bit attribute data with resolution of 1200 dpi is converted into 4-bit data with resolution of 600 dpi based on contents (in which the processed attribute data is created in accordance with the conditions (1) and (2)) described by using FIG. 5 in the attribute data conversion processing, and in the fallback compression processing, the original image data is compressed and subjected to the resolution conversion to 4-bit data with resolution of 600 dpi. Meanwhile, in the extension processing, by the matching processing for the attribute patterns in the fallback extension processing, the data concerned is extended and subjected to the resolution conversion to 8-bit data with resolution of 1200 dpi.

In Example 2 shown in FIG. 37*b*, in the compression processing, the 2-bit attribute data with resolution of 1200 dpi is converted into 4-bit data with resolution of 600 dpi based on contents (in which the processed attribute data is created in accordance with the conditions (1) to (4)) described by using FIGS. 6 and 7 in the attribute data conversion processing, and in the fallback compression processing, the original image data is compressed and subjected to the resolution conversion to 4-bit data with resolution of 600 dpi. Meanwhile, in the extension processing, by the matching processing for the attribute patterns in the fallback extension processing, the data concerned is extended and subjected to the resolution conversion to 8-bit data with resolution of 1200 dpi.

In Comparative example shown in FIG. 37C, in the compression processing, four pieces of 2-bit attribute data with resolution of 1200 dpi are converted into one piece of 2-bit attribute data with resolution of 600 dpi in accordance with the following conditions (21) to (23) in the attribute data conversion processing, and in the fallback compression processing, the original image data is compressed and subjected to the resolution conversion to 4-bit data with resolution of 600 dpi. Meanwhile, in the extension processing, by the conventional density pattern estimation processing in the fallback extension processing, the data concerned is extended and subjected to the resolution conversion to 8-bit data with resolution of 1200 dpi.

(21) In the case where at least one TAG(aij)=11 is included in four pieces of TAG(aij), then TAG(bij)=11

(22) In the case where TAG(aij)=11 is not present in four pieces of TAG(aij), but TAG(aij)=01 is included therein, then TAG(bij)=01

(23) In the case where all of four pieces of TAG(aij) are TAG(aij)=00, then TAG(bij)=00

As shown in FIGS. 37A to 37C, in Comparative example, the extended data is a little inferior in reproducibility in detail, and meanwhile, Example 1 and Example 2 succeed in reproducing even such details substantially accurately. Reasons for this are as follows. As shown in FIG. 37D, when the attribute data is divided based on the conditions (1) and (2) as to whether or not the pixels are of image, the density pattern of the original image substantially coincides with the attribute pattern. Therefore, in the event of the extension processing, in Comparative example, the density pattern is estimated based on a peripheral density, and accordingly, is affected by the peripheral density, and meanwhile, in Example 1 and Example 2, a density pattern that coincides with the attribute pattern is decided, and is not affected by the peripheral density.

Figure 38A:
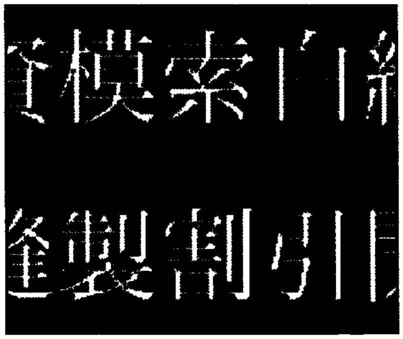
FIGS. 38A, 38B, 38C and 38D are views showing processing results by the fallback compression processing and the fallback extension processing.
Figure 38B:
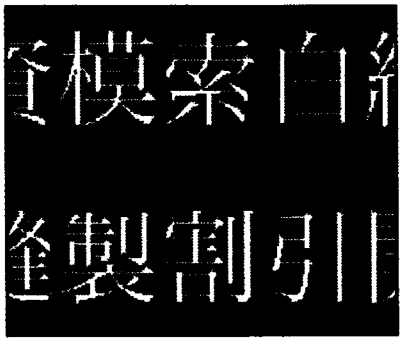
Figure 38C:
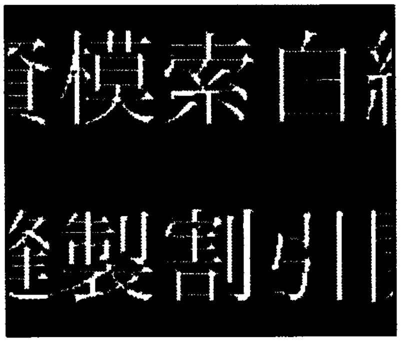
Figure 38D:
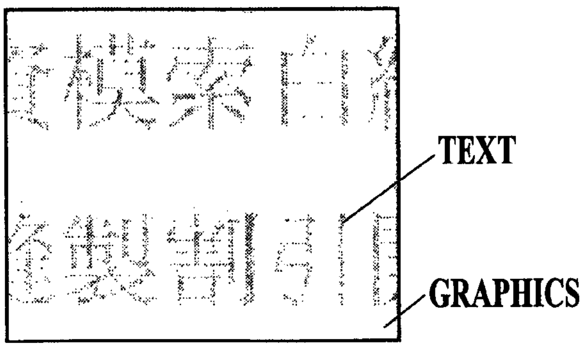

Next, a description is made of FIG. 38A to FIG. 38D. FIG. 38A shows an image of Example 1, FIG. 38B shows an image of Example 2, FIG. 38C shows an image of Comparative example, and FIG. 38D shows an image of the attribute data of the original image.

As shown in FIG. 38D, the original image is an 8-bit image with resolution of 1200 dpi in which text is written on a background of graphics. In the image of the attribute data, which is shown in FIG. 38D, a portion in which the attribute data is the text is displayed gray, and a portion in which the attribute data is the graphics (non-text) is displayed to be shaded.

In Example 1 shown in FIG. 38A, in the compression processing, the 2-bit attribute data with resolution of 1200 dpi is converted into 4-bit data with resolution of 600 dpi based on contents (in which the processed attribute data is created in accordance with the conditions (1) and (2)) described by using FIG. 5 in the attribute data conversion processing, and in the fallback compression processing, the original image data is compressed and subjected to the resolution conversion to 4-bit data with resolution of 600 dpi. Meanwhile, in the extension processing, the density pattern cannot be decided by the matching processing for the attribute patterns in the fallback extension processing, and accordingly, the data concerned is extended and subjected to the resolution conversion to 8-bit data with resolution of 1200 dpi by the estimation processing for the density pattern.

In Example 2 shown in FIG. 38B, in the compression processing, the 2-bit attribute data with resolution of 1200 dpi is converted into 4-bit data with resolution of 600 dpi based on contents (in which the processed attribute data is created in accordance with the conditions (1) to (4)) described by using FIGS. 6 and 7 in the attribute data conversion processing, and in the fallback compression processing, the original image data is compressed and subjected to the resolution conversion to 4-bit data with resolution of 600 dpi. Meanwhile, in the extension processing, by the matching processing for the attribute patterns in the fallback extension processing, the data concerned is extended and subjected to the resolution conversion to 8-bit data with resolution of 1200 dpi.

In Comparative example shown in FIG. 38C, in the compression processing, four pieces of 2-bit attribute data with resolution of 1200 dpi are converted into one piece of 2-bit attribute data with resolution of 600 dpi in accordance with the above-described conditions (21) to (23) in the attribute data conversion processing, and by the fallback compression processing, the original image data is compressed and subjected to the resolution conversion to 4-bit data with resolution of 600 dpi. Meanwhile, in the extension processing, by the conventional density pattern estimation processing in the fallback extension processing, the data concerned is extended and subjected to the resolution conversion to 8-bit data with resolution of 1200 dpi.

As shown in FIGS. 38A to 38C, in Comparative example and Example 1, the extended data is a little inferior in reproducibility in detail, and meanwhile, Example 2 succeeds in reproducing even such details substantially accurately. Reasons for this are as follows. As shown in FIG. 38D, in the original image having the attribute data as shown in FIG. 38D, when the attribute data is divided based on the conditions (1) and (2) as to whether or not the pixels are of image, then the attribute data is converted into attribute data indicating that all of the pixels are not of image. Meanwhile, when the attribute data is divided based on the conditions (3) and (4) as to whether or not the pixels are of text, then the density pattern of the original image and the attribute pattern substantially coincide with each other. Therefore, in the event of the extension processing, in Comparative example and Example 1, the density pattern is estimated based on a peripheral density, and accordingly, is affected by the peripheral density, and meanwhile, in Example 2, a density pattern that coincides with the attribute pattern is decided, and is not affected by the peripheral density.

As described above, in accordance with this embodiment, the density pattern, which coincides with the attribute pattern that is based on the binarized attribute data of the respective 2×2 pixels composing the region as the quantization target, can be decided as the density pattern before the quantization, and the attribute data concerned can be decoded in response to the density pattern concerned. Therefore, the attribute data can be decoded in response to the attributes of the respective pixels without being affected by the pixel values of the peripheral pixels, and the decoding accuracy of the extension processing can be enhanced.

In particular, by the attribute data conversion processing executed by the compression processing, the attribute data can be binarized based on the conditions (1) and (2) as to whether or not the attribute data of image is present. Accordingly, it can be indicated that the binarized attribute data is image or non-image. Therefore, the attribute pattern that is based on the binarized attribute data can hold the function to indicate how positional relationship (pattern) the pixels of image and the pixels of non-image have.

Hence, the density pattern that coincides with the attribute pattern is decided as the density pattern before the quantization, whereby the decoding accuracy can be enhanced.

Moreover, by the modification example of the attribute data conversion processing executed in the compression processing, the attribute data can be binarized by using the first intermediate attribute data binarized based on the conditions (1) and (2) as to whether or not the attribute data of image is present, or by using the second intermediate attribute data binarized based on the conditions (3) and (4) as to whether or not the attribute data of text is present. The binarized attribute data can indicate that the attribute data concerned is image or nor-image, or text or non-text.

Therefore, the attribute pattern that is based on the binarized attribute data can hold the function to indicate how positional relationship (pattern) the pixels of image and the pixels of non-image have, or how positional relationship (pattern) the pixels of text and the pixels of non-text have.

Hence, not only in the case where the attribute data of the respective pixels which compose the 2×2 pixels is image or non-image, but also in the case where the attribute data is text or non-text, the density pattern that coincides with the attribute pattern can be decided, and the decoding accuracy can be enhanced.

In particular, in this embodiment, in the event of quantizing the image of the high gradation region, the attribute data is binarized at the same time of quantizing the image based on the density pattern. Accordingly, in the event of decoding the quantized image in the high gradation region, the density pattern in the high gradation region before the quantization is decided in response to the attribute pattern that is based on the binarized attribute data, and in response to the decided density pattern, the quantized image can be decoded. Therefore, with regard to the high gradation region, the maintenance of the resolution can be achieved even after the compression and the extension.

Moreover, the image of the halftone region can be quantized and decoded by the BTC method, and accordingly, with regard to the halftone region, the maintenance of the gradation can be achieved even after the compression and the extension.

The above description discloses the example of using the storage unit 15 as a computer-readable medium for the program according to the present invention; however, the present invention is not limited to this example. As other computer readable recording mediums, there are applicable: a non-volatile memory such as a flash memory; and a portable recording medium such as a CD-ROM. Moreover, as a medium that provides the data of the program according to the present invention through a communication line, a carrier wave is also applied to the present invention.

Moreover, the present invention is not limited to the contents of the above-described embodiment, and is modifiable as appropriate within the scope without departing from the present invention.

According to an aspect of the present invention, there is provided an image processing apparatus including:

an image compression conversion unit that, in an event of quantizing an image having attribute data for each pixel, creates a density pattern in which pixel values of plural pixels composing a region as a quantization target are binarized, quantizes the region based on the density pattern, and binarizes, for each pixel, the attribute data individually owned by the plural pixels composing the region; and an image extension conversion unit that, in an event of decoding the image of the region quantized based on the density pattern by the image compression conversion unit, decides a density pattern of the region before the quantization in response to an attribute pattern that is based on the binarized attribute data of each of the plural pixels composing the region, and decodes the region in response to the decided density pattern.

According to the preferred embodiment of the present invention, decoding can be performed in response to the attribute of each pixel, without being affected by the pixel values of peripheral pixels, thereby improving the decoding accuracy in extension processing.

Preferably, the image extension conversion unit decides a density pattern coinciding with the attribute pattern as the density pattern before the quantization.

Preferably, based on whether or not the plural pixels have attribute data of image, the image compression conversion unit binarizes, for each pixel, the attribute data owned by the plural pixels composing the region.

Preferably, the image compression conversion unit converts the attribute data owned by the plural pixels composing the region into first intermediate attribute data in which the attribute data is binarized for each of the pixels based on whether or not the plural pixels have the attribute data of image and into second intermediate attribute data in which the attribute data is binarized for each of the pixels based on whether or not the plural pixels have attribute data of text, and by using the first intermediate attribute data or the second intermediate attribute data, binarizes, for each pixel, the attribute data owned by the plural pixels composing the region.

Preferably, in a case where the region is a high gradation region, the image compression conversion unit creates a density pattern in which pixel values of plural pixels composing the region are binarized, quantizes the region based on the density pattern, and binarizes, for each pixel, the attribute data individually owned by the plural pixels composing the region.

Preferably, the image compression conversion unit quantizes the region as the quantization target by a BTC mode in a case where the region is a halftone region, and the image extension conversion unit decodes the region, the region being quantized by the image compression conversion unit, by the BTC mode in the case where the region is a halftone region.

According to another aspect of the present invention, there is provided an image processing method including:

an image compression conversion step of, in an event of quantizing an image having attribute data for each pixel, creating a density pattern in which pixel values of plural pixels composing a region as a quantization target are binarized, quantizing the region based on the density pattern, and binarizing, for each pixel, the attribute data individually owned by the plural pixels composing the region; and an image extension conversion step of, in an event of decoding the image of the region quantized based on the density pattern by the image compression conversion step, deciding a density pattern of the region before the quantization in response to an attribute pattern that is based on the binarized attribute data of each of the plural pixels composing the region, and decoding the region in response to the decided density pattern.

According to the preferred embodiment of the present invention, decoding can be performed in response to the attribute of each pixel, without being affected by the pixel values of peripheral pixels, thereby improving the decoding accuracy in extension processing.

Preferably, in the image extension conversion step, a density pattern coinciding with the attribute pattern is decided as a density pattern before the quantization.

Preferably, in the image compression conversion step, for each pixel, the attribute data owned by the plural pixels composing the region is binarized based on whether or not the plural pixels have attribute data of image.

Preferably, in the image compression conversion step, the attribute data owned by the plural pixels composing the region is converted into first intermediate attribute data in which the attribute data is binarized for each of the pixels based on whether or not the plural pixels have the attribute data of image and into second intermediate attribute data in which the attribute data is binarized for each of the pixels based on whether or not the plural pixels have attribute data of text, and by using the first intermediate attribute data or the second intermediate attribute data, the attribute data owned by the plural pixels composing the region is binarized for each pixel.

Preferably, in a case where the region is a high gradation region, then in the image compression conversion step, a density pattern in which pixel values of plural pixels composing the region are binarized is created, the region is quantized based on the density pattern, and for each pixel, the attribute data individually owned by the plural pixels composing the region is binarized.

Preferably, in the image compression conversion step, the region as the quantization target is quantized by a BTC mode in a case where the region is a halftone region, and in the image extension conversion step, the region quantized by the image compression conversion step is decoded by the BTC mode in the case where the region is a halftone region.

What is claimed is:

1. An image processing apparatus comprising:

an image compression conversion unit that, in an event of quantizing an image having attribute data for each pixel, creates a density pattern in which pixel values of plural pixels composing a region as a quantization target are binarized, quantizes the region based on the density pattern, and binarizes, for each pixel, the attribute data individually owned by the plural pixels composing the region; and an image extension conversion unit that, in an event of decoding the image of the region quantized based on the density pattern by the image compression conversion unit, decides a density pattern of the region before the quantization in response to an attribute pattern that is based on the binarized attribute data of each of the plural pixels composing the region, and decodes the region in response to the decided density pattern, wherein the image extension conversion unit decides a density pattern coinciding with the attribute pattern as the density pattern before the quantization and wherein, based on whether or not the plural pixels have attribute data of image, the image compression conversion unit binarizes, for each pixel, the attribute data owned by the plural pixels composing the region.

2. The image processing apparatus of claim 1, wherein the image compression conversion unit converts the attribute data owned by the plural pixels composing the region into first intermediate attribute data in which the attribute data is binarized for each of the pixels based on whether or not the plural pixels have the attribute data of image and into second intermediate attribute data in which the attribute data is binarized for each of the pixels based on whether or not the plural pixels have attribute data of text, and by using the first intermediate attribute data or the second intermediate attribute data, for each pixel, the attribute data owned by the plural pixels composing the region.

3. The image processing apparatus of claim 1, wherein, in a case where the region is a high gradation region, the image compression conversion unit creates a density pattern in which pixel values of plural pixels composing the region are binarized, quantizes the region based on the density pattern, and binarizes, for each pixel, the attribute data individually owned by the plural pixels composing the region.

4. The image processing apparatus of claim 1, wherein the image compression conversion unit quantizes the region as the quantization target by a BTC mode in a case where the region is a halftone region, and the image extension conversion unit decodes the region, the region being quantized by the image compression conversion unit, by the BTC mode in the case where the region is a halftone region.

5. An image processing method comprising:

an image compression conversion step of, in an event of quantizing an image having attribute data for each pixel, creating a density pattern in which pixel values of plural pixels composing a region as a quantization target are binarized, quantizing the region based on the density pattern, and binarizing, for each pixel, the attribute data individually owned by the plural pixels composing the region; and an image extension conversion step of, in an event of decoding the image of the region quantized based on the density pattern by the image compression conversion step, deciding a density pattern of the region before the quantization in response to an attribute pattern that is based on the binarized attribute data of each of the plural pixels composing the region, and decoding the region in response to the decided density pattern, wherein, in the image extension conversion step, a density pattern coinciding with the attribute pattern is decided as a density pattern before the quantization and wherein, in the image compression conversion step, for each pixel, the attribute data owned by the plural pixels composing the region is binarized based on whether or not the plural pixels have attribute data of image.

6. The image processing method of claim 5, wherein, in the image compression conversion step, the attribute data owned by the plural pixels composing the region is converted into first intermediate attribute data in which the attribute data is binarized for each of the pixels based on whether or not the plural pixels have the attribute data of image and into second intermediate attribute data in which the attribute data is binarized for each of the pixels based on whether or not the plural pixels have attribute data of text, and by using the first intermediate attribute data or the second intermediate attribute data, the attribute data owned by the plural pixels composing the region is binarized for each pixel.

7. The image processing method of claim 5, wherein, in a case where the region is a high gradation region, then in the image compression conversion step, a density pattern in which pixel values of plural pixels composing the region are binarized is created, the region is quantized based on the density pattern, and for each pixel, the attribute data individually owned by the plural pixels composing the region is binarized.

8. The image processing method of claim 5, wherein, in the image compression conversion step, the region as the quantization target is quantized by a BTC mode in a case where the region is a halftone region, and in the image extension conversion step, the region quantized by the image compression conversion step is decoded by the BTC mode in the case where the region is a halftone region.

* * * * *